Figure 1:
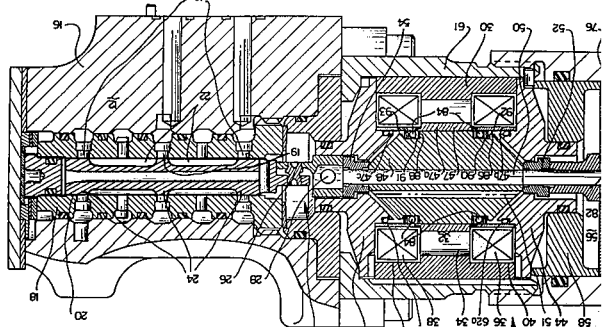

(No Model.)  
10 Sheets—Sheet 2.

R. T. SMITH.
EMBROIDERING MACHINE.

No. 377,408. Patented Feb. 7, 1888.

Fig. 2.

Witnesses.  
Robert Everett.  
Geo. L. Gray.

Inventor.  
Roswell T. Smith.  
By Charles R. Tilden  
Atty.

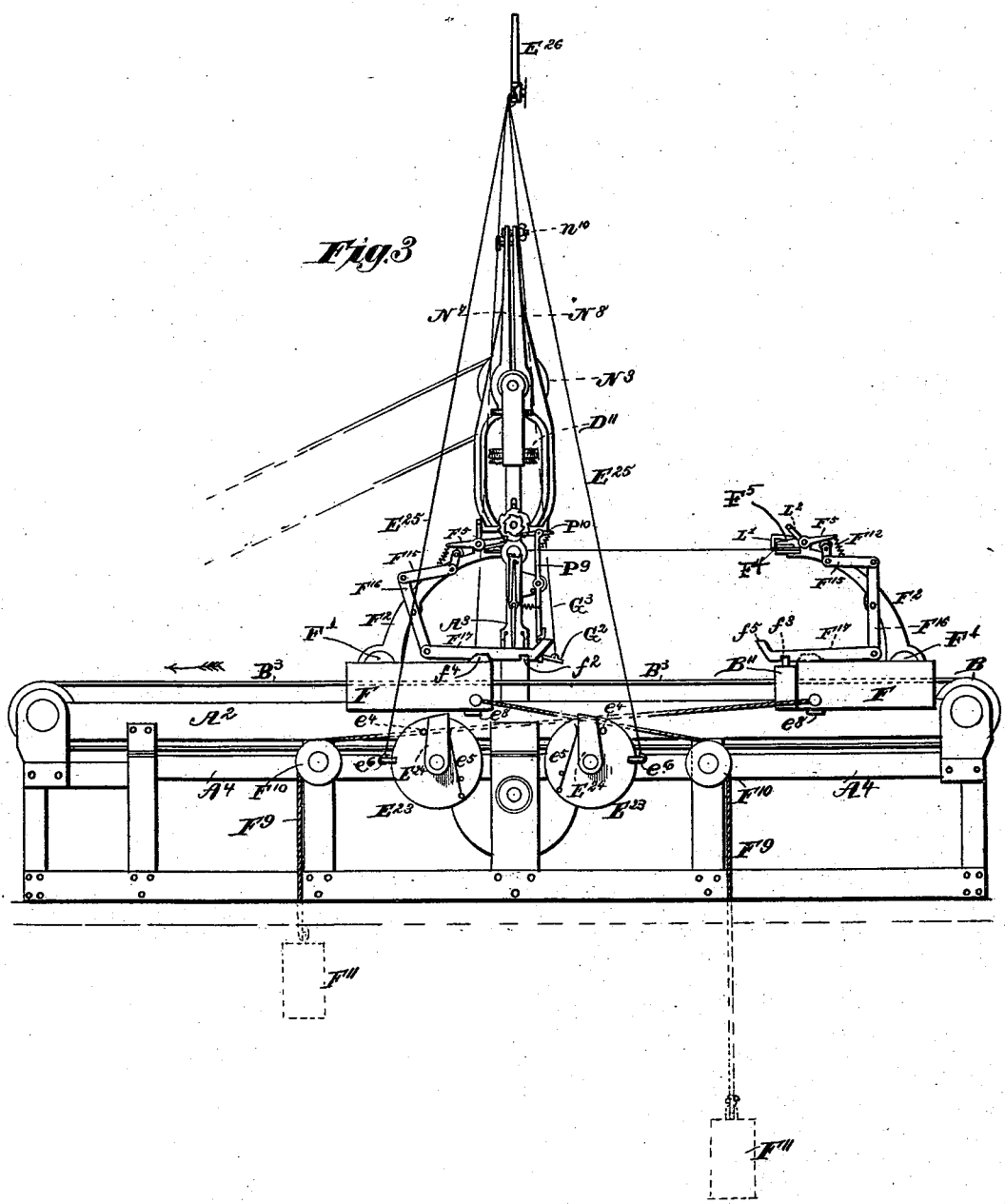

(No Model.)  10 Sheets—Sheet 4.
R. T. SMITH.
EMBROIDERING MACHINE.
No. 377,408.  Patented Feb. 7, 1888.
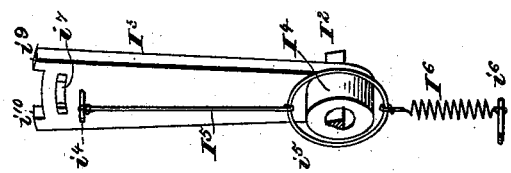
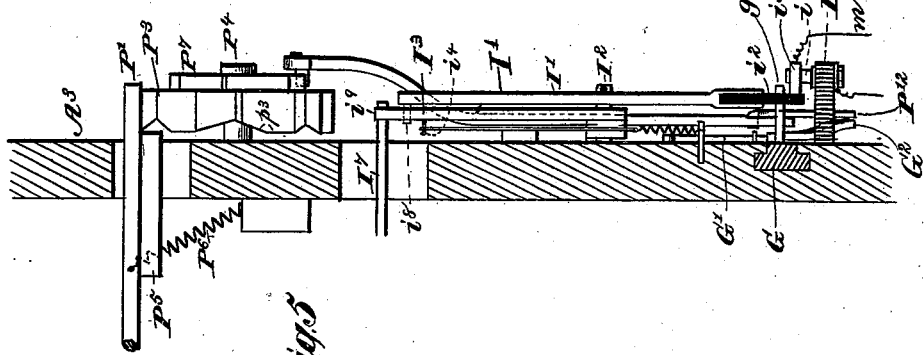
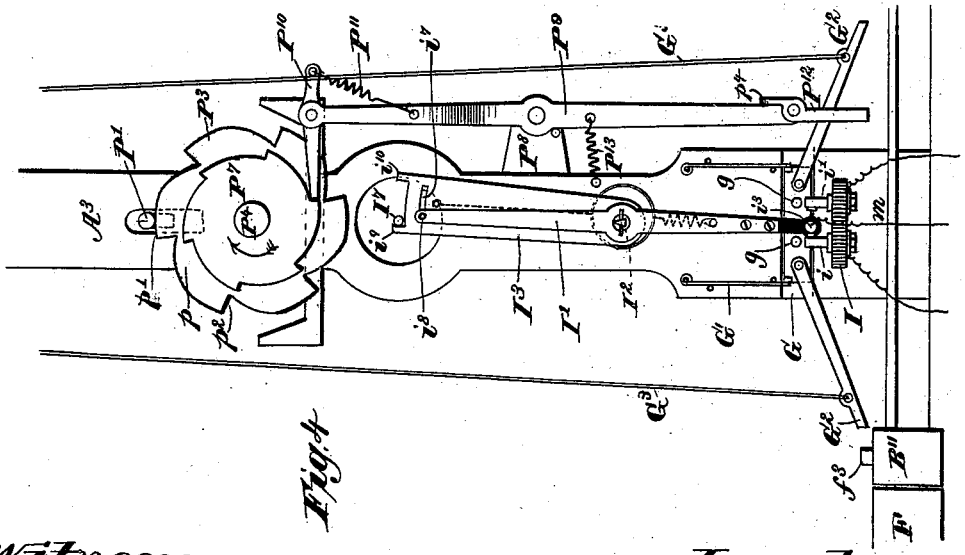
Witnesses.  Inventor.
Robert Smith.  Roswell T. Smith.
Geo. G. Gray  By Charles B. Tilden
 Atty.

(No Model.) 10 Sheets—Sheet 5.
R. T. SMITH.
EMBROIDERING MACHINE.
No. 377,408. Patented Feb. 7, 1888.
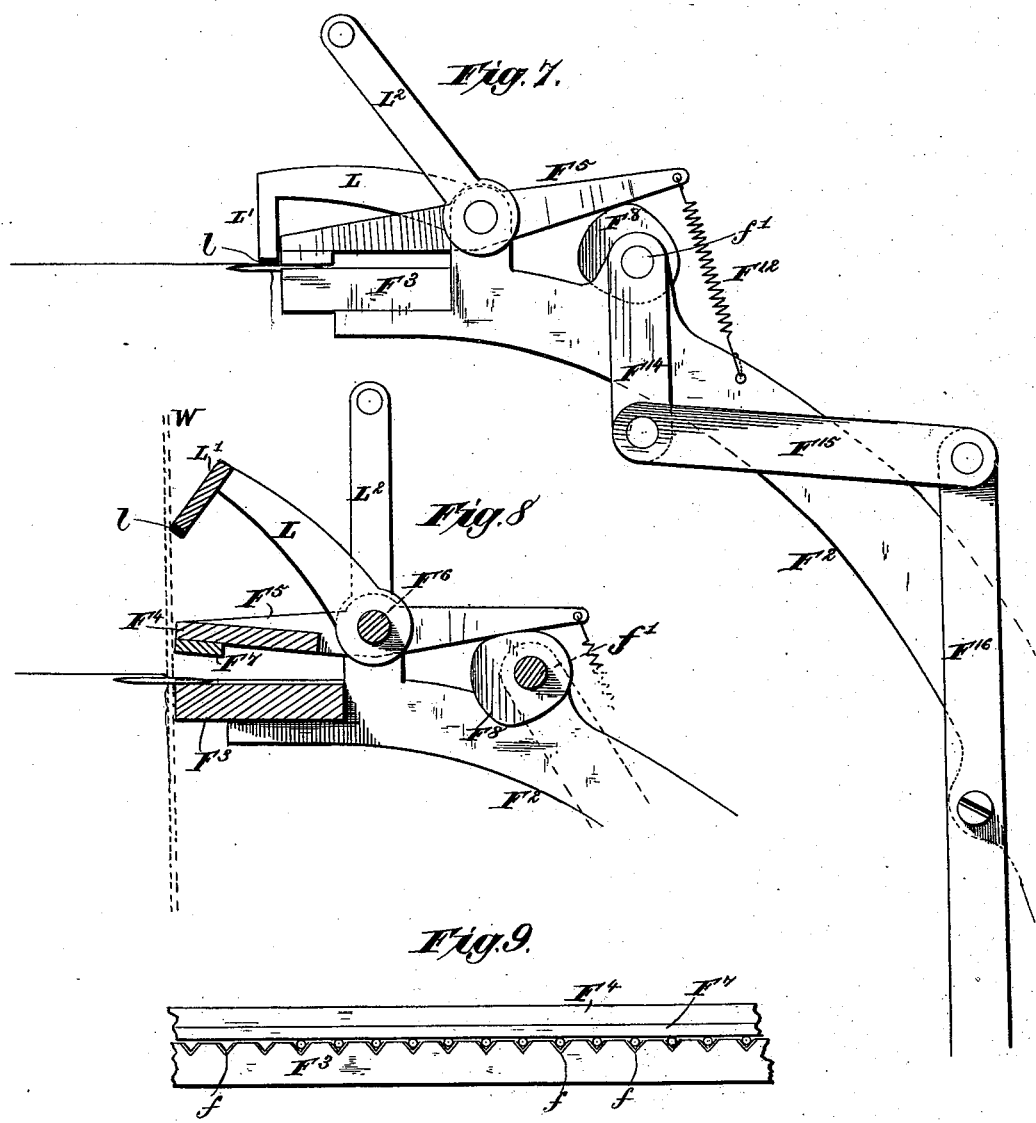
Witnesses
Robert Everett,
Geo. G. Gray
Inventor:
Roswell T. Smith.
By Charles D. Tilden
Atty.

(No Model.) 10 Sheets—Sheet 6.
R. T. SMITH.
EMBROIDERING MACHINE.
No. 377,408. Patented Feb. 7, 1888.
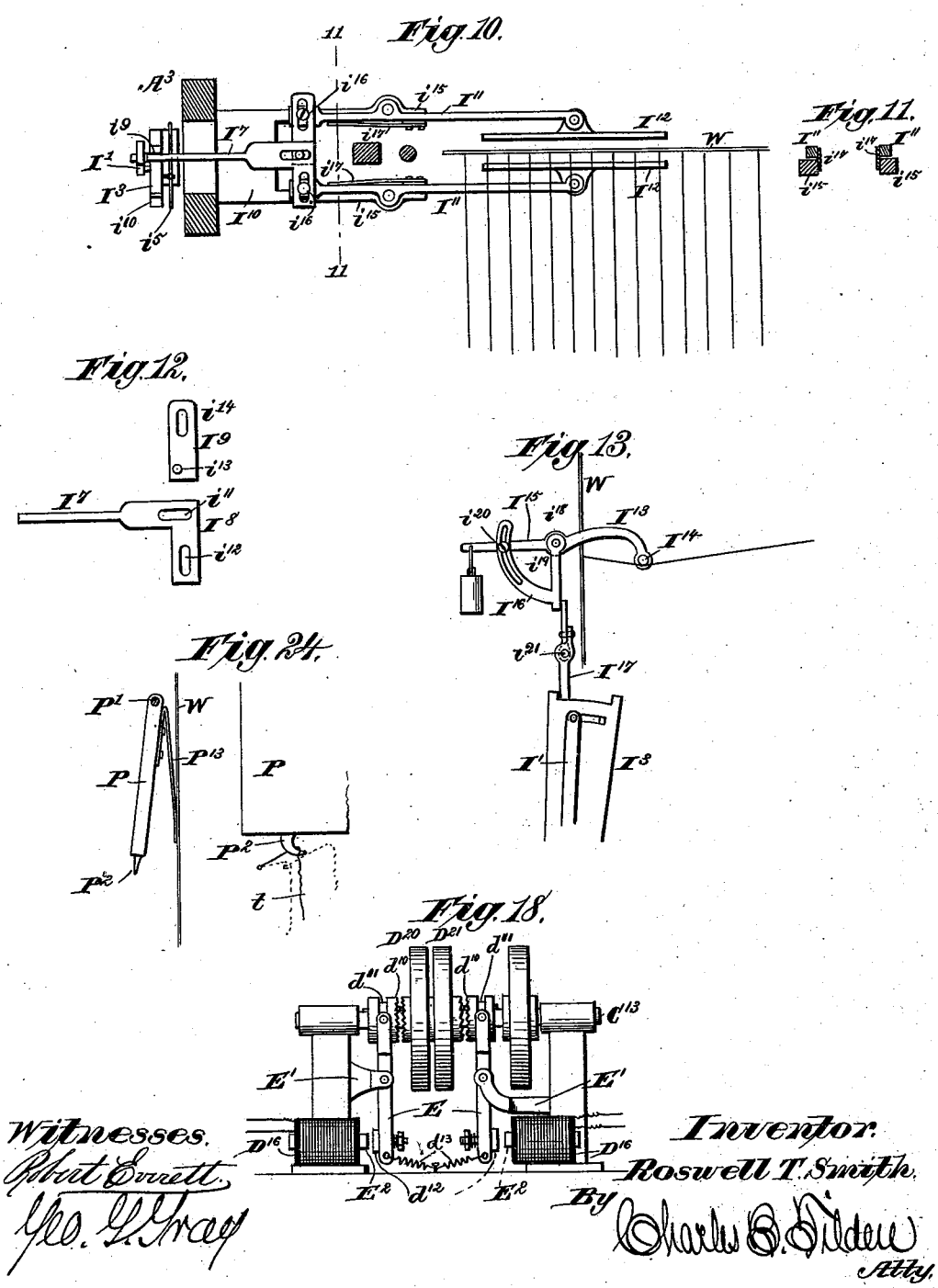
Witnesses
Robert Everett
Geo. L. Gray
Inventor:
Roswell T. Smith
By Charles B. Tilden
Atty.

(No Model.) 10 Sheets—Sheet 7.
R. T. SMITH.
EMBROIDERING MACHINE.
No. 377,408. Patented Feb. 7, 1888.
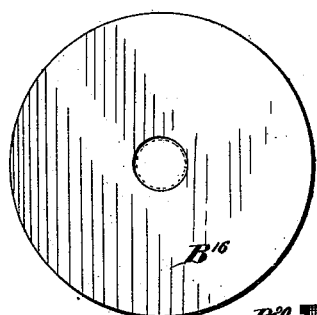
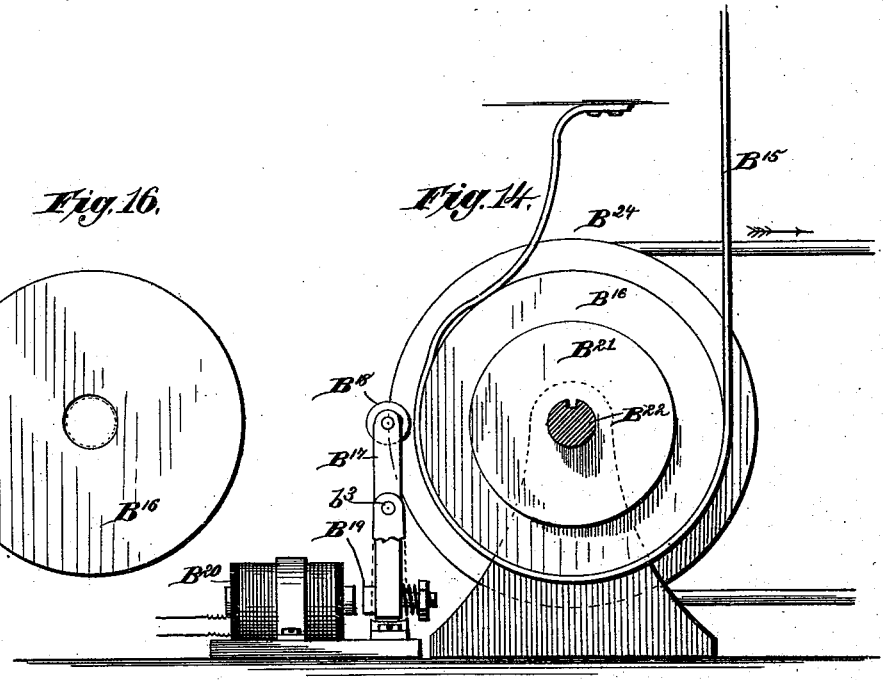
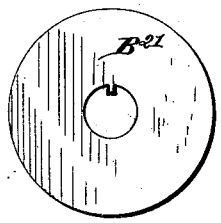
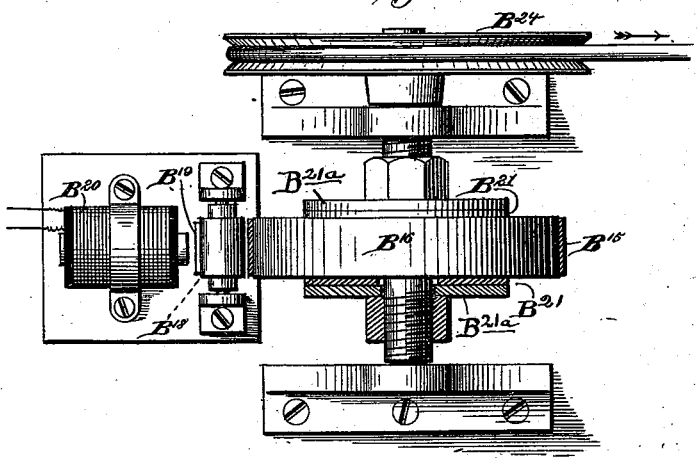
Witnesses
Robert Everett
Geo. L. Gray
Inventor
Roswell T. Smith
By Charles B. Gilden
Atty.

(No Model.) 10 Sheets—Sheet 8.
R. T. SMITH.
EMBROIDERING MACHINE.
No. 377,408. Patented Feb. 7, 1888.
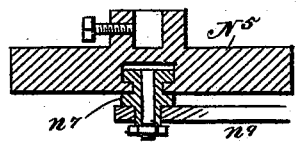
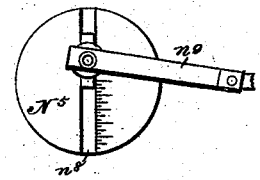
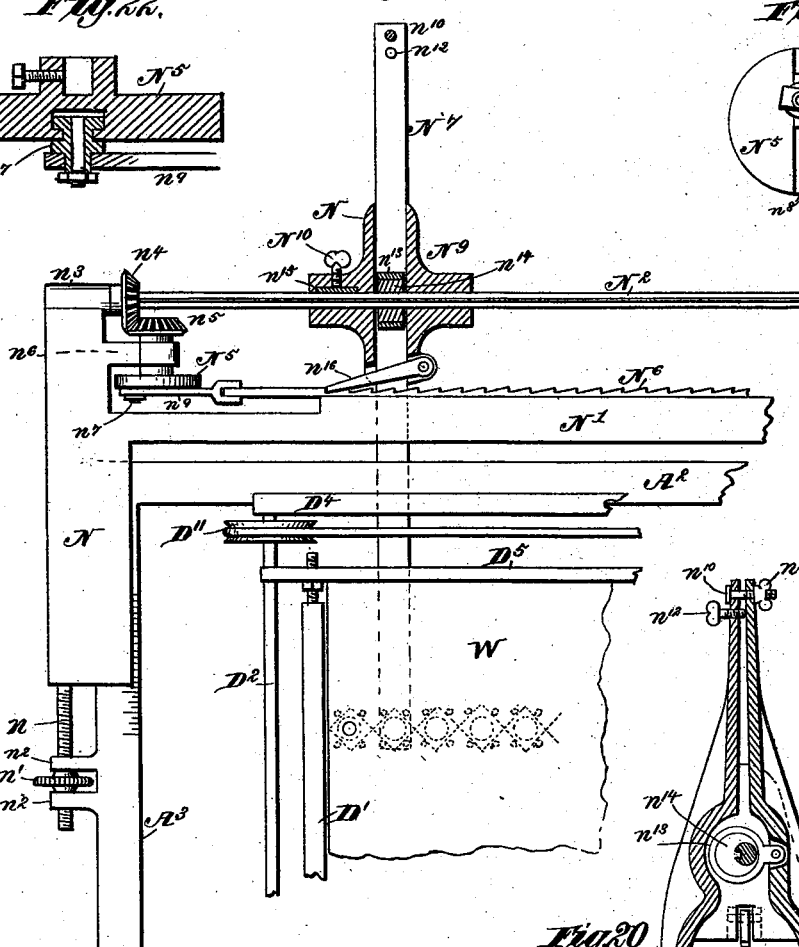
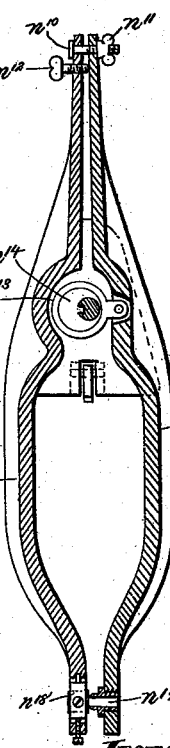
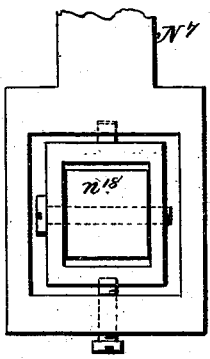
Witnesses.
Robert Everett.
Geo. T. May
Inventor:
Roswell T. Smith.
By Charles B. Tilden
Atty.

(No Model.)   R. T. SMITH.   10 Sheets—Sheet 9.
EMBROIDERING MACHINE.

No. 377,408.   Patented Feb. 7, 1888.

Witnesses.
Robt Everitt
Geo. G. Gray

Inventor:
Roswell T. Smith.
By
Charles B. Tilden
Atty.

(No Model.) 10 Sheets—Sheet 10.
R. T. SMITH.
EMBROIDERING MACHINE.
No. 377,408. Patented Feb. 7, 1888.
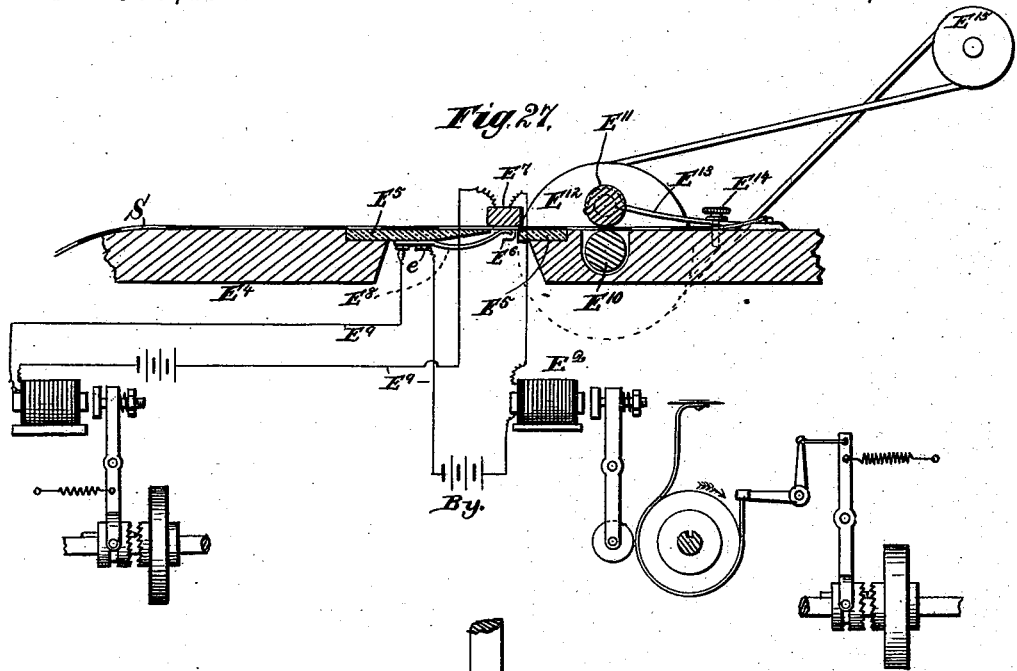
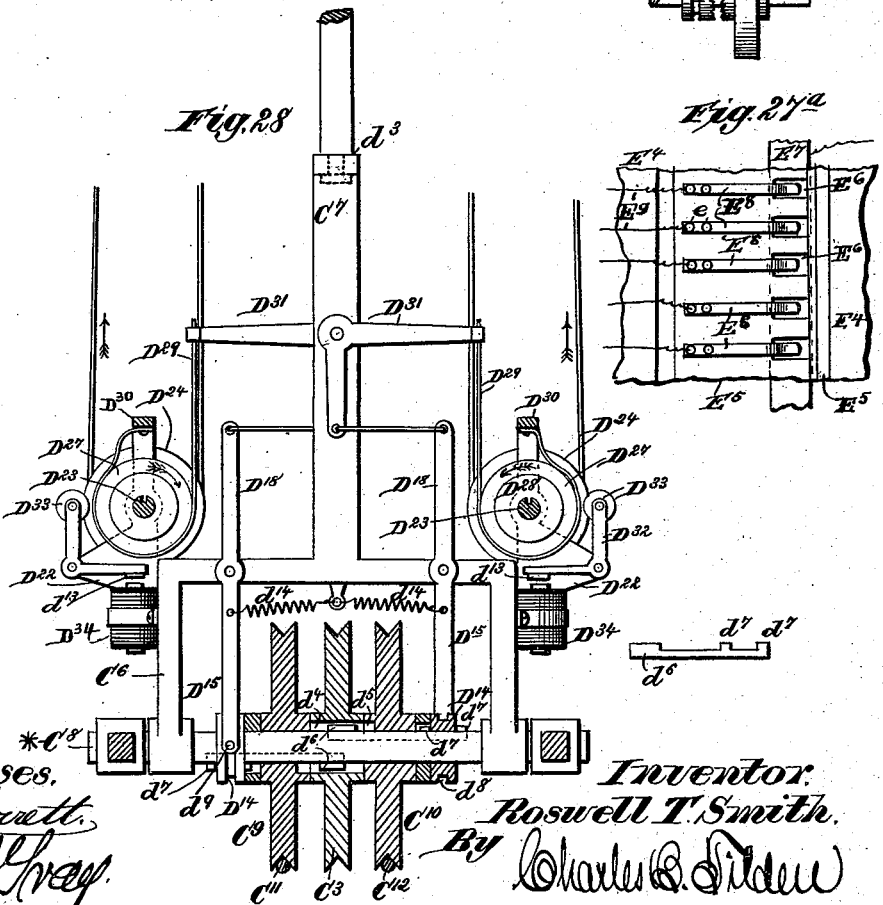
Witnesses.
Inventor.
Roswell T. Smith.

UNITED STATES PATENT OFFICE.

ROSWELL T. SMITH, OF NASHUA, NEW HAMPSHIRE, ASSIGNOR TO HIMSELF, NATE W. GODDARD, OF SAME PLACE, AND GEORGE H. DUNHAM, OF NEW YORK, N. Y.

EMBROIDERING-MACHINE.

SPECIFICATION forming part of Letters Patent No. 377,408, dated February 7, 1888.

Application filed June 10, 1885. Serial No. 168,237. (No model.)

*To all whom it may concern:*

Be it known that I, ROSWELL T. SMITH, a citizen of the United States, residing at Nashua, in the county of Hillsborough and State of New Hampshire, have invented certain new and useful Improvements in Embroidering-Machines, of which the following is a specification, reference being had to the accompanying drawings.

My invention relates to automatic mechanism for embroidering upon a textile fabric any suitable ornamental design of the kind ordinarily produced by what are commonly known as the "Heilmann" or "Swiss" embroidering-machines.

In order to clearly show the novel features of my invention and to clearly and correctly point out the new results effected thereby, I shall briefly set forth at the outset of this specification the state of the art substantially as it is now practiced, and then point out the new and important results accomplished by my discovery. I will then describe my invention by reference to the accompanying drawings, and in said description I shall follow substantially the order of operation of the several parts as nearly as may be, showing the construction and function of each part separately and its relation to those elements with which it is combined.

Heretofore and prior to my invention embroidering by machinery has been practiced in substantially the manner following: The textile fabric or web upon which the design is to be produced is mounted upon a frame in such a manner as to impart to such fabric the requisite tension. This fabric-frame is so combined with well-known operative devices that it may be moved horizontally or vertically to any required degree, or, if required, in the direction of a diagonal resultant. The nature of these movements and the degree of each depend upon the character of the pattern which is to be worked, and each movement of the fabric or web must represent the displacement of the needle or needles required for the formation of each successive stitch, the organization of the mechanism being such as to require that this displacement shall be effected by the movement of the fabric-frame, and not by the adjustment of the needles. The thread by which the pattern is worked is carried by a double-ended needle having a central eye, the number of the needles employed in a single machine varying from three hundred (300) to one thousand, (1,000,) or thereabout, according to the size of the machine and the interval at which the needles are arranged upon a single needle-carriage. These needles are carried by gripping-bars extending horizontally and parallel with the surface of the web or fabric, and these gripping-bars are mounted upon and carried by needle-carriages, which move alternately toward and from the fabric-frame. All the needles employed are carried up to and projected through the web or fabric simultaneously, and their projecting ends are delivered to similar gripping-bars mounted upon the carriage upon the opposite side of the fabric, by which the whole range of needles is grasped simultaneously, and by the movement of the second or receiving carriage pulled through the web until the threads are drawn taut and the stitch formed. During the intervals between the successive passages of the needles through the fabric the frame upon which the latter is stretched is moved in such a direction and to such a degree that when the needles return they will pass through the fabric at the proper point for the formation of the new or succeeding stitch.

It will be understood, of course, that throughout the entire series of needles precisely the same stitch is made by each needle, and similar patterns or designs are embroidered by each needle in the series.

In the Swiss machines, by which the greater part of the embroidery sold in the market is produced, it has been customary to effect the movement of the web by the hand of the operator, the latter being guided by a design or pattern of enlarged or colossal size, the several adjustments being effected by a device commonly known as a "pantograph," the construction and operation whereof are too familiar to require description here. In effecting this adjustment considerable muscular strength and endurance are required, in addition to great skill and long experience. In one form of these machines, also, the needle-carriages are moved or reciprocated by the right hand of the operator, and the left hand is employed in guiding the pantograph upon the enlarged pattern, while the needle-bars are clamped and unclamped by mechanism operated by one or both feet. In machines of another construction, while the fabric-frame has been adjusted by means of a pantograph similar to that mentioned above, the needle-carriages have been reciprocated by power, and the reversal of the movement of said carriages has been automatically effected by a tension-bar resting upon the threads carried by the needles, and rising and falling as the threads are tightened and slackened by the movement to and fro of the needle-carriages, the reversal of the movement of each carriage being effected by the lifting of the tension-bar caused by the tension upon the threads as each stitch is drawn home.

It will readily be seen that the repeated adjustment of a web or fabric ranging from the lesser sizes to a length of twenty-four feet, or thereabout, must be, when it is performed by manual effort, an extremely laborious undertaking. Moreover, in determining the degree of adjustment by the use of the pantograph slight errors or variations from an exact pattern are unavoidable. While these errors are reduced to the minimum both by the exaggeration of the size of the pattern and by the skill of the trained operator, they are nevertheless of such character as to frequently and seriously impair the appearance of the product, and it has been long considered eminently necessary that the adjustment of the fabric-frame shall be effected by positive and automatic mechanism; but the organization of these machines has heretofore been such that these results have been impractical.

It is the initial purpose of my invention, therefore, to eliminate the presence of an operator or attendant from the action of this class of mechanism, to effect the movements of the fabric-frame by positive means, to render this adjustment entirely accurate, and to effect what may be termed the "stitch-forming" adjustment by automatic apparatus which is capable of giving most delicate and exact movements to the fabric-frame, the action of said mechanism being timed, determined in degree, and wholly controlled by a perforated sheet having a step-by-step or intermittent feed, said sheet accomplishing all the functions which devolve upon the operator or attendant in the Swiss machines heretofore mentioned.

In this class of machines the separate threads, which are equal in number to the whole number of needles employed, have each a length substantially equal to the maximum distance traversed by either needle-carriage during its movement toward or from the web, sufficient additional length being of course allowed to permit the ends to be drawn through the eyes of the needles and drop a little below the same. It will be readily understood that as the work progresses the threads are constantly shortened by the slight consumption required for the formation of each successive stitch. It is evident, therefore, that at each reciprocation of the needle-carriages the space traversed in drawing the threads through the web to form the stitch must diminish by the exact quantity of thread required to effect such formation. This thread consumption is by no means in a constant ratio, since the stitches are frequently of different length, according to the demands of the pattern to be worked. The retrograde movements of each needle-carriage, by which the stitch formation is completed, must be arrested and reversed exactly at the point when such movement has produced the degree of tension on the threads which is required to properly effect such formation. Heretofore this reversal of the movement of the needle-carriages has in one class of machines been effected by the operator, as already mentioned. In a later machine, however, it has been rendered automatic, the reversing mechanism being operated by means of a "tension-bar," which rests upon the threads between the web and the needle-carriage, said bar dropping as the threads slacken and rising as they are drawn taut. This tension-bar is arranged parallel with the web and extends over the whole series of threads employed, and is connected with a rock-shaft operated by the rise and fall of the bar, whereby the shifting clutch by which the reversal is effected is thrown into and out of engagement with the actuating-gear, the reversal being thus effected at the instant when the threads used in the production of the figure or design are drawn taut upon the fabric. While this mode of operation is in many respects desirable, it is nevertheless open to some objections, among which the following only need be mentioned here. The power required to effect the reversal being considerable, it is evident that the strain upon the threads, by which the tension-bar is raised, to effect such reversal must be such as not only to endanger the rupture of one or more thereof, owing to the fact that inequalities in the web or in the set of the needles are liable to shorten some of the threads more rapidly than others, but, moreover, the resistance of the said tension-bar is at all times liable to cause an excessive tension, whereby the stitches are drawn so closely into the fabric as to affect, and in some cases seriously impair, the integrity of the fabric upon which the pattern is embroidered. This will readily be understood when it is remembered that in certain kinds of work the embroidered design is produced by exceedingly attenuated threads upon a textile fabric which is lightly woven, and which possesses such slight comparative strength that a very gentle tension upon the threads carried by the embroidering-needles might virtually disrupt the web at the terminals of each stitch. This fact will more readily appear when it is remembered that a very little increase in the friction of the reversing mechanism, owing to the absence of proper lubrication or to an undue accumulation of dust, may at any moment cause an excessive drag upon the threads, and the same result also might, even with the utmost care and attention, be produced by a slight binding of the clutch-box, which is shifted by the rise of the embroidering-threads. From these as well as from other causes not mentioned it is obvious that an entire pattern or strip of the partly-embroidered fabric might at any moment be so far injured as to be rendered worthless.

For these reasons it is one purpose of my invention to effect the reversal of the needle-carriages in such manner as to avoid all the objections specified, while at the same time I effect such reversal automatically and govern the same by the tension of the threads, so that the reciprocation takes place at the moment when the stitch is drawn home in the fabric with the exact tension necessary for its proper formation.

It is also my purpose to render the thread-tension by which the reversal is effected variable, in order that the same machine may be adapted to work upon fabrics and to produce designs of different strength and texture, and requiring not only threads of different size and strength, but involving a variation in the tension exerted upon such threads for the formation of the stitch. I propose, also, in this connection, to so organize the reversing mechanism that it may be operated by a very light tension upon the threads, and may have substantially an instantaneous action, whereby the needle-carriages may be arrested at that exact point in their retrograde movement when the threads carried through the web have been drawn home just far enough to properly form the stitch, the principal objects of my invention in this respect being to render the reversal automatic, to effect it by the exercise of the minimum of power, to time it with great precision, and to provide means whereby the tension required to effect such reversal may be varied to adapt the machine to different kinds of work.

In the production of certain classes of embroidery it is necessary to form openings or perforations in the web by removing portions of the same, such openings being necessary to the production of the pattern. Heretofore and prior to my invention these cuttings have been formed, in most instances by hand, by the use of suitable tools; but this process is not only slow and liable to a certain degree of inaccuracy, but it requires the time and labor of a skilled operator, which materially enhances the cost of production. It is my purpose, therefore, to provide simple mechanism having automatic and positive action, which may be caused to travel over the fabric with an intermittent movement or feed, which is subject to adjustment in degree, said mechanism being adapted to cut in the fabric at stated intervals any desired series of cuttings, each produced by the removal of a small portion of the web, these cuttings being formed preparatory to the production of the finished strip.

It is also my purpose to provide means for giving accurate vertical adjustment to the frame supporting the automatic cutters, and to combine with the latter simple and efficient means for varying the feed thereof, whereby the distance between the successive cuttings or between the successive sets or groups of cuttings may be varied to correspond with the requirements of the design.

It is a further purpose of my invention to combine with each needle-carriage simple mechanism having positive action, whereby the threads which are carried by the double-ended needles are effectually prevented from being withdrawn from the eyes of said needles, the fastening devices being so arranged as to lock the threads during the time the same are under tension and to entirely release them at the moment when the needles are shifted from one carriage to the other and while they are passing through the web.

It is my object, also, to improve the construction and operation of the needle-carriers and to so form the gripping-bars that needles of any desired size may be used therewith without shifting said parts to accommodate the finer varieties of needles.

In a large portion of the different kinds of machine-made embroidery sold upon the market it is customary to finish the design by forming a portion thereof by means of what may be termed a "button-hole" stitch, and it is one object of my present invention to provide automatic means whereby any required design may be produced by the formation of such a stitch, whether the same be employed for the completion of a previously-embroidered pattern or for the purpose of forming a design by the use of such a stitch only.

It is of great importance in this class of mechanism that the apparatus shall be so organized that any desired variation in proportion may be readily effected between the design produced and the pattern from which it is formed—that is to say, my purpose is to so organize the machine that by giving different rates of speed to the parts by which the adjustments of the fabric-frame are effected (the feed of the sheet by which said adjustment is controlled being constant) I may produce a design embroidered upon the web carried by said frame which shall, as regards size or proportions, bear any desired relation to the original pattern. In other words, I propose to produce duplicate designs of different size by merely providing means whereby the relative speed of the mechanism adjusting the position of the fabric-frame may be varied relatively to the feed of the element by which the time, kind, and degree of such adjustment are controlled.

In describing the construction and operation of the various parts of this machine I shall, as I have already stated, follow as nearly as possible the order of operation pursued in producing an embroidered pattern thereby.

Figure 26:
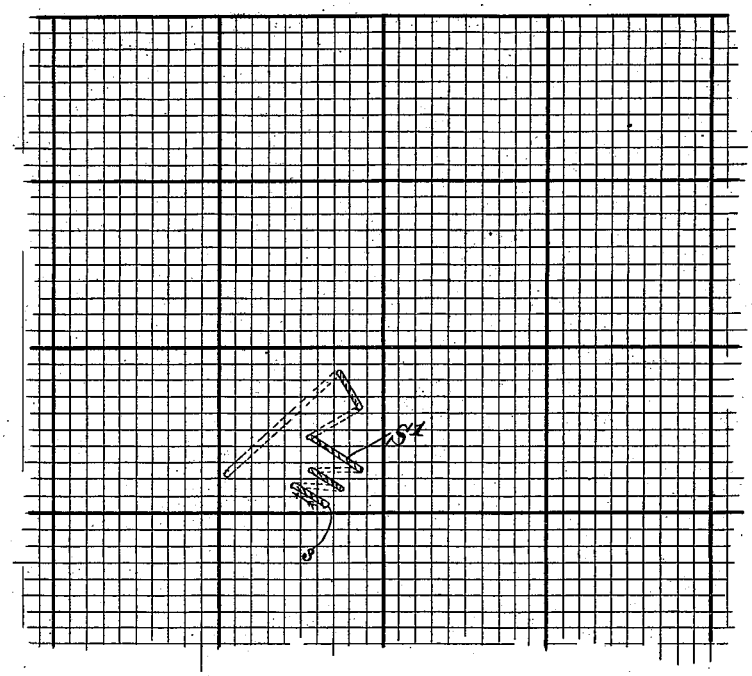
Figure 25:
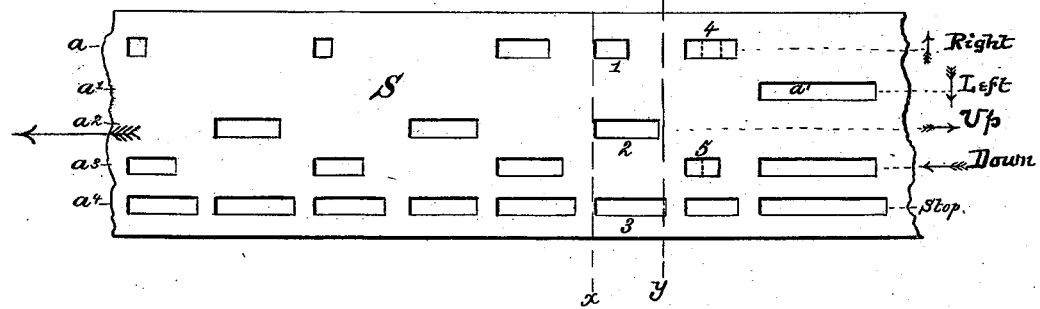

Referring to the drawings forming part of this application, Figure 1 is a plan view of the entire machine with the exception of the devices which control the movements of the fabric-frame. Fig. 2 is a transverse vertical section taken in the plane 2 2, Fig. 1, the parts omitted from the latter figure being shown, for convenience, at the left hand of the figure. Fig. 3 is a side elevation of the machine, the power, counter, and driving shafts, with some of the connections, being omitted. Fig. 4 is a detail elevation, enlarged, of part of the mechanism shown in Fig. 3, including the mechanism for effecting an automatic reversal of the needle-carriages, means for giving movement to the devices for forming the button-hole stitch, and the apparatus for preventing the needle-carriages from too closely approaching the web while the latter is in motion. Fig. 5 is a central vertical section of Fig. 4. Fig. 6 is a detail perspective, taken from the rear, of the reversing-lever shown in Figs. 4 and 5, detached. Fig. 7 is a detail side elevation, enlarged, showing a portion of one of the needle-carriages, comprising the needle-bars, the thread-fastener, and the means by which said parts are actuated. Fig. 8 is a section of Fig. 7, taken transversely to the needle-bars and showing the parts in a different position. Fig. 9 is a front elevation of a portion of the needle-bars shown in Figs. 7 and 8, the other parts being omitted. Fig. 10 is a horizontal detail section showing the actuating-levers by which the reversing devices shown in Figs. 4, 5, and 6 are operated. Fig. 11 is a transverse vertical section upon the line 11 11, Fig. 10. Fig. 12 is a detail showing the construction of certain portions of the reversing-lever shown in Fig. 10, detached. Fig. 13 is a detail showing a modified form of the reversing mechanism. Fig. 14 is a detail view, in side elevation, of the mechanism for throwing the clutch whereby the apparatus for adjusting the fabric-frame is brought into operation. Fig. 15 is a plan view of the parts illustrated in Fig. 14. Fig. 16 is a detail of the pulley shown in Figs. 14 and 15, together with the shaft upon which it is mounted, the latter being shown in dotted lines. Fig. 17 is a detail of the friction-disk shown in Fig. 14, detached. Fig. 18 is a front elevation showing a modified construction of the parts illustrated in Figs. 14 and 15. Fig. 19 is a partial transverse section of the machine, taken in a vertical plane and substantially in the line of the supporting-shaft by which the automatic cutting devices are fed and operated, the same parts being shown in elevation in Fig. 2. Fig. 20 is a vertical section taken centrally through the cutting devices, showing their operating devices and part of the feeding devices, the section-plane being at right angles to the section-plane of Fig. 19. Fig. 21 is a detail plan view of the pitman shown in Fig. 19, with its operating device, showing means for adjusting it to longer and shorter strokes. Fig. 22 is an enlarged detail section of Fig. 21, taken across the line of the central slot in the disk. Fig. 23 is a detail elevation, enlarged, showing the self-adjusting cutter-plate used in combination with the cutters shown in Fig. 20. Fig. 24 is a view, partly in side elevation and partly in front elevation, of the devices employed in forming the button-hole stitch, the same parts being shown in reduced size in Fig. 2. Fig. 25 is a plan view of a portion of the perforated or "stencil" sheet whereby the movements of the fabric-frame are automatically controlled. Fig. 26 is a diagram in which the stitch adjustments produced by the stencil are illustrated, the movement of the fabric-frame being denoted in the diagram by an enlarged representation of several stitches, the illustration also showing the method of calculating the length and determining the relative transverse arrangement of the several openings in the stencil-sheet. Fig. 27 is a longitudinal vertical section of the stencil-table with its connections, showing the stencil in place. Fig. 27$^a$ is a bottom plan view of part of the table shown in Fig. 27, showing a plurality of the spring-fingers and the controlling-circuits. Fig. 28 is a view, partly in section and partly in elevation, of the hanger-bracket containing the gearing which drives the shaft giving horizontal adjustment to the fabric-frame.

In the said drawings, the reference-letter A indicates any suitable supporting-frame for the operative parts of the mechanism. Within one end of this frame, or near it, is journaled a transverse shaft, B, extending from side to side of the frame and carrying upon each end a pulley or a sprocket, B'. At or near the remote end of each side frame is journaled in any suitable bearing a sprocket, B$^2$, each being arranged in the same plane of rotation with the corresponding sprocket, B'. The sprockets last named are geared with sprockets B$^2$ by belts, chains, or the equivalent thereof, B$^3$, the device shown being a belt having perforations which engage with teeth or points upon the periphery of each pulley, as shown at $b$ in Fig. 1.

The pulleys or sprockets B' are driven by power communicated from a counter-shaft, C, removed a little from one end of the machine. This counter-shaft carries two tight pulleys, C' and C$^2$, which are belted by a cross and a straight belt, respectively, to pulleys B$^4$ and B$^5$ upon the shaft B. Both pulleys last named are loose upon the shaft B, and rotation in opposite directions is imparted to the latter by locking one or the other of the said pulleys with the shaft, which is effected in the manner presently to be described. It is by the rotation of this shaft B that the needle-carriages receive movement toward and from the fabric upon which the design is produced.

The fabric upon which the embroidered design is produced is supported in a frame, D, consisting of two vertical members, D', rising from and rigidly connected with a horizontal piece having upon each end a boss, $d$, tapped to receive a vertical shaft, $D^2$, having a male thread formed upon its lower end. The vertical screw-shafts are seated in bearing-blocks $D^3$, which straddle a transverse portion, A', of the supporting-frame A, and their upper extremities are journaled in the extremities of a bar, $D^4$, which is channeled or slotted upon its upper edge to receive a transverse strip, $A^2$, of the frame, upon which said bar is adjustable longitudinally in the manner presently to be described.

Between the upper portions of the two vertical shafts $D^2$ is extended a horizontal bar, $D^5$, the ends whereof are either perforated or forked to embrace said shafts. Near each end of this bar is formed an opening which receives the threaded end of the upright member D' of the fabric-frame, nuts $d'$ being turned upon each upright to support the bar $D^5$ and give vertical adjustment thereto. A bar, $D^6$, is mounted upon the lower ends of the shafts $D^2$, and acts as a strut or brace to prevent springing the lower portions thereof.

To the lower horizontal member of the fabric-frame is firmly connected a flexible flap, $D^7$, of any suitable material, and to the upper parallel bar, $D^5$, is connected in like manner a similar flap, $D^8$. The web W is attached to these flaps by its longer parallel edges, the attachment being effected by coarse stitching, or in any other suitable manner.

It should be noted that the flaps $D^7$ and $D^8$ should be made of strong and comparatively inelastic material, in order that where the proper tension is imparted to the web there shall be little or no stretching of the flaps. The web being connected with the frame in this manner, any required tension may be imparted to it by simply turning the nuts $d'$ in one direction or the other. The adjustable bar $D^5$ being rigid, an equal tension may be imparted in this manner to every part of the web.

In order to give proper rigidity to the stretching-bar without materially increasing its weight, a longitudinal rib may be formed upon its upper surface, as indicated in Fig. 2.

The blocks $D^3$, in which the vertical shafts $D^2$ have bearing, are, as already mentioned, supported upon a transverse portion, A', of the machine-frame. One of the blocks $D^3$ is tapped to engage with the threaded end of a horizontal shaft, $D^9$, the plain end of said shaft passing through the other block and having a bearing in the vertical post $A^3$, which rises from the transverse support A'.

It will be seen that by rotating the shaft $D^9$ in one direction or the other I can effect any required horizontal adjustment of the fabric-frame. In like manner the two vertical shafts $D^2$, which are geared together by a belt, $D^{10}$, running upon pulleys $D^{11}$, rigid upon the upper extremities of said shaft, will produce by their rotation any desired vertical adjustment of the fabric-frame; and by a combination of these two adjustments—the vertical and the horizontal—I obtain every stitch adjustment which can by any possible pattern be required. Moreover, the construction and organization of the adjusting mechanism is such that it is capable of giving the minimum and maximum web adjustments with such precision and mathematical exactness that embroidery produced upon a machine embodying this method of stitch adjustment will be far superior to the product of any machine in which the adjustment is effected manually.

The shafts $D^2$ are operated by means of a pulley, $D^{12}$, mounted upon one of said shafts and driven by a belt or cord, $D^{13}$, carried by a pulley, $C^3$, which is journaled in a bracket hanging from the main shaft $C^4$, which is provided with the main driving-pulley $C^5$. This bracket, which is shown in Figs. 1 and 28 at $C^6$, is hung by a rod, $C^7$, from the main shaft $C^4$, as shown in elevation in Fig. 2, the bracket being thereby dropped into about the same horizontal plane with the pulley $D^{12}$. The shaft $D^2$, carrying said gear or pulley, is connected with the bracket by a rod or shaft, $C^8$, (shown in Fig. 1,) the end of said rod having a fork, $d^2$, which straddles the gear. The hanger $C^7$ is provided with a swivel-joint, $d^3$, at any suitable point to allow the bracket to turn slightly to accommodate the pulleys to the horizontal adjustment of the fabric-frame, this swiveling adjustment being effected by the rod or shaft $C^8$, which also serves to retain the cord or belting $D^{13}$ at a uniform tension. This will be readily understood by taking Figs. 1, 2, and 28 in connection, from which it will be seen that the rod $C^8$ is rigidly connected to the bracket-frame $C^6$, while the drop-rod $C^7$, being hung from the shaft $C^4$ by a fork, $c^*$, (shown in Fig. 2,) has a swinging motion toward and from the fabric-frame as far as may be required by the longitudinal movements of the latter. The swivel-joint $d^3$ in the drop-rod $C^7$, Fig. 28, permits the bracket $C^6$ to turn as the fabric-frame moves to and fro in a line parallel with the main shaft, and the rod $C^8$ preserves at all times a uniform distance between the bracket $C^6$ and the pulley $D^{12}$, thus preserving the tension of the belt running from the pulley on the bracket to the pulley actuating the threaded shaft of the fabric-frame.

The cord $D^{13}$, which drives the vertical shafts $D^2$, is geared with a pulley, $C^3$, on a shaft, $*C^8$, which has bearing in said bracket $C^6$. Mounted upon the same shaft are two pulleys, $C^9$ and $C^{10}$, one upon each side of the pulley $C^3$. These pulleys are normally loose upon the shaft, and the hub of the central pulley, $C^3$, is provided with an annular chamber, $d^4$, which communicates with recesses $d^5$, formed in the hubs of both the other pulleys.

Within longitudinal channels formed in the shaft $*C^8$ are arranged sliding splines $d^6$, which project outward beyond the hubs of the outer pulleys, and have detents $d^7$, (see Fig. 28,) which engage with a collar, $D^{14}$, provided with a peripheral groove or channel, $d^8$, which receives pins $d^9$, carried by the forked end of a lever, $D^{15}$, pivoted upon the bracket $C^6$. By operating one or the other of these levers in the manner presently to be described one of the splines $d^6$ is thrown toward the adjacent outer end of the shaft and drawn into the recess $d^5$ in the hub of the outer pulley, thereby locking said pulley to the shaft and causing the central pulley, $C^3$, to revolve with it during the time the spline remains in the position described. During the time this engagement continues the other spline remains in the position shown in Fig. 28, the central pulley, $C^3$, revolving about it without making operative engagement with it. It will readily be seen that but one of these splines can be thrown into engagement at the same time, since the outer pulleys, $C^9$ and $C^{10}$, revolve in opposite directions.

The two pulleys $C^9$ and $C^{10}$ are driven by a straight belt and a cross-belt, $C^{11}$ and $C^{12}$, respectively carried by pulleys $C^{13}$ and $C^{14}$ upon the main shaft $C^4$. The outer pulleys upon the bracket, being loose upon the shaft, revolve continuously, the central pulley, $C^3$, which drives the pulley $D^{12}$, by which the vertical shafts $D^2$ are actuated, being motionless, except at such times as said central pulley, $C^3$, is locked with one or the other of the pulleys $C^9$ or $C^{10}$.

I shall describe presently the manner in which the vertical adjustments of the fabric-frame are effected automatically.

The horizontal adjustments of the fabric-frame are, as already stated, effected by the rotation in one direction or the other of the screw-shaft $D^9$, (see Fig. 2,) which engages with one of the sliding blocks $D^3$, moving upon the horizontal support $A'$. This shaft is driven in opposite directions by pulleys $D^{16}$ and $D^{17}$, (see Figs. 1 and 2,) rigid upon the shaft, and driven one by a straight belt and the other by a cross-belt, $D^{18}$ and $D^{19}$, respectively. These belts are carried by pulleys $D^{20}$ and $D^{21}$, loosely mounted upon a counter-shaft, $C^{13}$, which receives movement from the main shaft $C^4$, by means of a suitable belt and pulleys. The shaft $C^{13}$ has continuous revolution, and the pulleys loosely mounted thereupon are brought separately into action by means of clutches $d^{10}$, which are splined upon and revolve with the shaft $C^{13}$, and are thrown into engagement with the pulleys by means of levers E, (see Fig. 18,) fulcrumed upon brackets $E'$, projecting from the standards supporting the shaft. Each of these levers is forked to partly embrace the sliding clutch, and from the branches of each fork project pins which engage with a peripheral groove or channel, $d^{11}$, formed in the clutch-box.

The levers E are actuated in the manner following: Upon the free end of each is mounted an armature, $d^{12}$, and opposite each armature and within a suitable distance therefrom is arranged an electro-magnet, $E^2$. These magnets are vitalized by a current produced by any suitable battery, and the moment the circuit is made the core of the magnet attracts the armature of the lever, and thereby throws the clutch into engagement with the pulley and sets the latter in motion, said engagement continuing as long as the magnet holds the armature. The instant the circuit is broken, however, a spring, $d^{13}$, connected with the end of the lever, throws the armature off the core and disengages the clutch from the pulley. By operating one or the other of the pulleys $D^{20}$ and $D^{21}$ in the manner described the fabric-frame receives any required horizontal adjustment in either direction.

The construction of the clutch-shifting levers and the arrangement of the magnets are shown in detail in Fig. 18.

I have already described the mechanism by which I give vertical adjustment to the fabric-frame, and have shown in connection with Fig. 28 the devices by which the actuating-pulley is driven in opposite directions. I have shown that the clutch-shifting levers are pivoted upon the bracket and that by their action the sliding splines are operated in such a manner as to lock the central pulley with either one of the outer pulleys, thereby giving rotation to the vertical shafts of the fabric-frame in opposite directions. I will now describe the means whereby the shifting-levers are operated, and will then show the manner in which the stitch adjustment is rendered wholly automatic.

Upon the bracket $C^6$ are mounted in suitable bearings, $D^{22}$, shafts $D^{23}$, which carry pulleys $D^{24}$, each of which receives continuous rotation from a pulley, $D^{25}$, upon the main shaft $C^4$. Upon each one of the shafts $D^{23}$ is loosely mounted a belt-pulley, $D^{27}$, which is clasped upon each of its vertical faces by a friction-disk, $D^{28}$, which is splined upon the shaft, the construction being such that said disks grip the pulley with force sufficient to effect the rotation of said pulley with the shaft, but permit the pulley to slip between them whenever the resistance to its revolution shall be sufficient to overcome the frictional grasp of the disks. Over each pulley is carried a belt, $D^{29}$, having one end secured to any suitable support, $D^{30}$, and the other connected to the horizontal arm of a bell-crank, $D^{31}$, which is pivoted upon the hanger $C^7$ and has the extremity of its vertical arm connected with the free end of one of the shifting-levers $D^{15}$.

Pivoted upon a bracket forming part of the shaft-support $D^{22}$ is a bell-crank, $D^{32}$, having upon one arm an armature, $d^{13}$, and carrying in the forked extremity of the other arm an idle-roll, $D^{33}$. Directly beneath the armature $d^{13}$ is placed an electro-magnet, $D^{34}$, which will, when vitalized by the current passing through its coil, attract the armature and draw the idle-roll D³³ against the belt D²⁹ with sufficient force to bind said belt upon the continuously-revolving roll D²⁸ and cause the latter to draw with the required power upon the bell-crank D³¹, whereby one or the other of the sliding splines d⁶ is operated. The idle-roll D³³ will of course remain in engagement with the belt as long as the current flows uninterruptedly through the coil of the magnet; but by the construction I have already described, when the pulley D²⁷ has fully accomplished its function, the strain upon the belt D²⁹ becomes sufficient to slip said pulley between the friction-disks carrying it, whereby it exerts a constant and continuous tension upon the belt, and, through the bell-crank and the shifting-lever connected to it, holds the spline in engagement and effects the rotation of the pulley C³ as long as the magnet remains vitalized. The construction and arrangement of the parts thus described are duplicated upon the opposite side of the bracket, as the outer pulleys, C¹¹ and C¹², revolve in opposite directions. Each of the shifting-levers is restored to its original position when the battery-circuit is broken by means of a spiral spring, d¹⁴.

Slight modifications of construction of the slip-pulley and the friction-disks by which it is carried are shown upon an enlarged scale in Figs. 14 to 16, inclusive, and will be fully described hereinafter.

I will now describe the manner in which the stitch adjustment is rendered automatic.

I have shown in Fig. 2, at the left hand of said figure, a supporting-frame, E³, of any suitable form and construction. This frame carries a table, E⁴, which is shown in detail in Fig. 27. In this table is formed a broad transverse opening, which is partly closed by plates E⁵, formed of vulcanized rubber or other non-conducting material. Between the adjacent edges of these plates is left a narrow transverse opening, E⁶. Over the surface of this table is drawn a "stencil-sheet," S, the specific construction whereof will presently be shown. This stencil travels over the transverse slot or channel E⁶, and at said point it passes beneath a bar, E⁷, arranged just above and parallel with the said opening, sufficient space only being allowed to permit the free passage of the stencil. The bar E⁷ is formed of any suitable conducting material, and is supported at each end in insulated bearings.

To the under surface of one of the non-conducting plates E⁵ are attached two or more spring-fingers, E⁸, having their points so arranged that they will by their own elasticity spring through the opening E⁶ and make contact with the bar E⁷. Each of these fingers is formed of conducting metal, and to each one is attached by a binding-post, e, a wire, E⁹, leading from one pole of a battery, By, the circuit being through the finger, the bar E⁷, the coil of an electro-magnet, E², and thence to the other pole of the battery.

I have shown in the present case five of the spring-fingers E⁸, that number being preferable for reasons presently to be shown; but I do not limit my invention to any specific number of such devices.

The stencil-sheet S, which runs over the table E⁴, is carried by feed-rolls E¹⁰ and E¹¹, the former being driven by a pulley, E¹², while the latter roll is journaled in spring-bearings E¹³, the elastic tension of which may be varied by adjusting a set-screw, E¹⁴, upward or downward. The stencil is made of any suitable non-conducting material, such as paper, gelatine, partly-vulcanized rubber, or other substance. It is shown in plan in Fig. 25, and from this illustration it will be seen that the sheet is perforated by a series of longitudinal cuttings, which I have designated in the drawings by the reference-letters a, a', a², a³, and a⁴. These openings are so arranged upon the sheet transversely that each series coincides with one of the spring-fingers E⁸. Now, as the stencil is fed forward over the table it will be seen that the said fingers will spring through the openings and make contact with the bar E⁷, thereby closing the circuit in which said finger lies.

I have indicated at the right hand of Fig. 25 the function of each series of perforations. The series a and a' make and break the circuits by which the electro-magnets E² in Fig. 18 are vitalized. These magnets throw the clutches d¹⁰, by which the pulleys D²⁰ and D²¹ are brought into action. These pulleys effect the horizontal adjustments of the fabric-carrying frame in opposite directions, in the manner already described. The degree of such adjustment is exactly proportioned to the length of the opening by which it is effected. In like manner the series a² and a³ make the circuits in which the electro-magnets D³⁴ are interposed. These magnets are mounted upon the bracket C⁶ and throw the splines by which the pulley C³ is locked with one or the other of the oppositely-revolving pulleys C⁹ and C¹⁰. Thereby, as I have already explained, I actuate the vertical screw-shafts D² and effect the vertical adjustments of the fabric-frame.

I have introduced in Fig. 27 two battery-circuits merely for the purpose of more complete illustration, in one of which the magnet acts upon the shifting-lever direct, while in the other it actuates a lever carrying an idle-roll which binds the belt upon the continuously-revolving pulley by which the shifting-lever is operated. I propose to employ either one or both of these forms, as circumstances may require.

The pulley E¹², (see Figs. 2 and 27,) by which the rolls feeding the stencil are rotated, is driven by a cross-belt from a pulley, E¹⁵, upon a counter-shaft, E¹⁶, which carries a cone-pulley, E¹⁷, belted to a reverse cone, E¹⁸, upon the main shaft, as shown in Fig. 2. The purpose of this construction will be explained hereinafter.

The final series of perforations, a⁴, in the stencil is employed for two purposes, one being to hold the locking-clutch in operative engagement with the pulley from which the rotation of the stencil-feeding rolls is derived, while the second function thereof is to break the circuit of the magnet effecting such engagement and arrest the movement of the stencil after each stitch adjustment has been completely effected. It is hardly necessary to say that in this as well as in the four series of cuttings which control the vertical and horizontal adjustments of the fabric-frame the electric circuit is interrupted or broken by the progressive movement of the stencil, which brings the imperforate portions $a^5$ thereof between the spring-fingers $E^8$ and the bar $E^7$, as clearly shown in Fig. 27.

The several stitch adjustments must necessarily take place between the successive passages of the needles through the fabric, since the latter must, at the instant each passage is effected, remain without motion in the proper position.

It will be seen from the previous description that if the stitches were always made at stated and unvarying intervals of time the stencil might have a continuous feed movement, sufficient interval being allowed between each transverse series of cuttings to permit the action of the needle-carriages before the next approaching series effect the succeeding adjustment. As the needle-carriages, however, move always at the same speed, as the distance over which they move is constantly decreased by the shortening of the threads, which are consumed by the formation of the design, it is evident that the stitch adjustment cannot be so timed as to correspond accurately with the stitch formation. It is necessary, therefore, that after effecting each successive stitch adjustment the stencil should be arrested, and that its movement should not be resumed until the stitch called for by such adjustment has been so far formed as to permit the movement of the fabric preparatory to the next succeeding stitch.

Referring, now, to Figs. 2 and 27, the driving-pulley $E^{15}$, by which the stencil is moved, is loose upon the shaft $E^{16}$, which receives continuous revolution from the main shaft in the manner already described. Mounted upon and splined to the shaft is a clutch, $E^{19}$, which is thrown by a shifting-lever, $E^{20}$, into and out of engagement with the pulley. This lever is pivoted upon a bracket, $E^{21}$, and is provided with an armature, $e^2$, mounted upon its free end. Upon a suitable support is mounted an electro-magnet, $E^{22}$, the coil whereof is in circuit with that one of the spring-fingers $E^8$ which registers with the series $a^4$ of the stencil-perforations. The clutch is disengaged from the pulley by means of a spring, $e^3$, attached to the free end of the lever, whereby the armature $e^2$ is thrown off the magnet the moment the circuit is broken, the movement of the stencil being thereby arrested.

Referring, now, to Fig. 25 of the drawings, wherein the large arrow at the left hand of the figure indicates the direction traveled by the stencil, it will be noted that the initial extremities of the perforations in the several series lie or may lie in substantially the same transverse line, whereas the perforations in the series $a^4$ are prolonged, so that their final extremities or terminal points fall a little behind the terminals of the longest perforations lying transversely opposite. In order to make this matter easily understood, I have numbered three of the openings shown in Fig. 25 as follows:

The reference-numeral 1 indicates the perforation by which the fabric-frame is adjusted horizontally toward the right, as already described, while the figure 2 denotes the downward adjustment, these movements being represented by the small arrows at the right of the figure, it being understood that the directions indicated by the arrows are merely relative and have no connection with the arrangement of the figure upon the drawing-sheet. The figure 3 denotes the opening in the series $a^4$. A transverse line, $x\,x$, will coincide with the initial extremities of each of these openings, but a parallel line, as $y\,y$, drawn through the terminal of the perforation 3 will fall behind the terminals of both the perforations 1 and 2. The purpose of this construction is as follows: As the perforations in the series $a^4$ are those by which the magnet $E^{22}$ is vitalized, whereby the progressive movement of the stencil is effected, it is evident that the latter must at each movement be carried far enough to break the circuits corresponding to the perforations 1 and 2, which, as I have explained, is effected by feeding the stencil far enough so that the imperforate portion thereof is interposed between the spring-fingers $E^8$ and the conducting-bar $E^7$. For this reason, therefore, the perforations in series $a^4$ are each prolonged beyond the terminal of the longest perforation in the other series.

It should be noted that in the preparation of the stencil perforations should not be formed side by side, except in those cases where the one perforation gives vertical and the other horizontal adjustment. These movements may take place simultaneously, as I have indicated in the case of the openings denoted by the reference-numerals 1 and 2.

After each stitch adjustment has been effected and the movement of the stencil has been arrested in the manner described, the stitch is formed by the mechanism presently to be described. After the needles have passed completely through the web, and while the carriage receiving them is retreating, in order to draw the stitch into the fabric, it is necessary that the succeeding stitch adjustment should be effected, and for this purpose an impulse must be given to the stencil sufficient to withdraw the imperforate portion by which the circuit is broken in series $a^4$ from between the spring-finger $E^8$ and the bar $E^7$. The instant this is effected the circuit is made and the magnet $E^{22}$ will hold the clutch in engagement with the feeding-pulley $E^{15}$, Fig. 2, until the circuit is again broken after the adjustment is finished.

Although it is an anticipation of the proposed order of description, I will explain at this point the means by which I automatically impart to the stencil its initial forward movement after each interval of rest.

Referring to Fig. 3 of the drawings, upon the horizontal member $A^4$ of the frame are journaled disks $E^{23}$, one upon each side of the standard or upright $A^3$ of the frame. Upon the axis of each disk is pivotally mounted a pawl, $E^{24}$, the points whereof project slightly beyond the peripheries of said disks and are beveled off oppositely, so that the projecting angle lies nearest the upright $A^3$. Behind each pawl a pin, $e^4$, is rigidly set in the disk, and a leaf-spring, $e^5$, holds each pawl against the pin, while at the same time the elasticity of said spring permits the pawl to be tilted over toward the spring without disturbing the position of the disk.

Projecting from the periphery of each disk $E^{23}$ is a stud or finger, $e^6$, to which is connected a wire or cord, $E^{25}$, which is carried up to and connected with the horizontal arm of a bell-crank, $E^{26}$, which is pivoted upon a bracket-frame, $E^{27}$. (Shown in Fig. 2.) The vertical arm of this bell-crank is connected by a wire, $e^7$, with the upright arm of a similar bell-crank, $E^{28}$, mounted upon the same bracket, and the horizontal arm of the latter bell-crank is connected by a wire, $E^{29}$, (shown in Fig. 2,) with a third bell-crank, $E^{30}$, the vertical arm of the latter being attached to the free extremity of the shifting-lever $E^{20}$ (see Fig. 2) by any suitable means. Upon each of the carrier-blocks F, by which the needle-carriages are supported, as shown in Fig. 3, is formed a stud or point, $e^8$, projecting from the lower surface of said block. Now, as either of these carriages approaches the fabric this stud will ride over the pawl $E^{24}$, tilting it inward as it passes, but producing no movement of the disk. As either one of the carriages recedes from the fabric, however, the stud $e^8$ will engage with the point of the pawl and will give a partial rotation to the disk, thereby drawing upon the wire $E^{25}$, which is connected to said disk, rocking the bell-cranks $E^{26}$, $E^{28}$, and $E^{30}$, and thus throwing the locking-clutch $E^{19}$ into engagement with the pulley $E^{15}$, from which the movement of the stencil is derived. The engagement effected in this manner need be for an instant only, since an exceedingly-limited movement of the stencil is sufficient to make the circuit in the succeeding perforation of series $a^4$ in the stencil, whereupon the magnet $E^{22}$ is vitalized and the clutch held in engagement by its attraction until the stitch adjustment is completed.

It will be seen by reference to Fig. 3 that a certain distance must be traversed by the carrier-blocks F as they recede from the fabric before the studs $e^8$ operate the disks $E^{23}$, and thereby initiate the progressive movement of the stencil. This distance is sufficient to enable the needle-carriages to wholly remove the needles from the web before the stencil is again set in motion to effect a new stitch adjustment.

The studs $e^8$ upon the under surface of the carrier-blocks F should have sufficient extent longitudinally, so that they will hold the wires $E^{25}$ under tension for a moment, or until the circuit-breaking portion of the stencil has fully withdrawn from between the spring-finger $E^8$, which registers with series $a^4$ of the stencil, and the bar $E^7$.

By the mechanism thus described every possible stitch adjustment of the fabric-frame is automatically effected with the greatest precision and accuracy.

Mounted upon the horizontal and parallel members of the frame (shown at $A^2$ in Figs. 2 and 3) are carrier-blocks F, each having a central longitudinal slot or channel which receives the edge of the rail $A^2$ and permits free movement in the blocks in either direction. Mounted upon each pair of these blocks is a transverse shaft, $F'$, mounted in a suitable bearing, as shown in Figs. 1 and 3, and upon each of these shafts are mounted the arms $F^2$, which support the needle-carriages. These parts are shown in plan in Fig. 1, and as to the upper portion of the carriages and needle-holding mechanism in Figs. 7, 8, and 9.

The needles which carry the embroidering-threads are of the construction usually employed in this class of mechanism. They are shown substantially in Figs. 7 and 8, each needle being provided with a point upon each end and having a central eye which carries the thread. Upon each of the carrier-bars $F^2$ is mounted a needle-bar, $F^3$, provided at suitable and equal intervals with V-shaped slots or apertures $f$, in which the needles rest. This construction permits the use of needles of various sizes without the necessity of shifting the needle-holding bar.

The needles are held upon each needle-bar by means of a grasping and releasing bar, $F^4$, which is placed upon an arm, $F^5$, pivoted upon the carriage by a shaft, $F^6$. Upon the bar $F^4$ is mounted a strip or block of elastic material, $F^7$, which is clamped down upon the needles lying in the slots $f$, and which, by its elasticity, is readily forced into the said slots, so that it will securely hold needles of any size, even though they be so fine that they lie wholly below the horizontal surface of the needle-bar $F^3$. The arm $F^5$, by which the bar $F^4$ is clamped and released, is operated by a cam, $F^8$, by means which will be hereinafter described.

The carrier-blocks F are moved in one direction by the belts or chains $B^3$, (see Figs. 1, 2, and 3,) which receive movement from the sprockets $B'$. Upon the shaft B, carrying these sprockets, are mounted two loose pulleys, $B^4$ and $B^5$, which are driven in opposite directions by a cross and a straight belt from pulleys $C'$ and $C^2$, both fast upon a continuously-revolving counter-shaft, C.

Splined upon the shaft B adjacent to each of the loose pulleys are clutches $B^6$ and $B^7$, and connected therewith are clutch-shifting levers $B^8$ and $B^9$, both pivoted upon a bracket, $B^{10}$. The shaft B is revolved in opposite directions successively by the alternate engagement of these clutches with their pulleys.

By reference to Fig. 3 it will be seen that the belts $B^3$ pass completely through the carrier-blocks. They also have free and unobstructed movement through the body of each block. Upon each belt intermediate of the needle-carriages is rigidly fastened a driving-block, $B^{11}$, and to each carrier-block F is connected a cord, $F^9$, running over a pulley, $F^{10}$, journaled upon the remote side of the standard, and having a suitable weight, $F^{11}$, attached to its end. It will readily be seen that the gravity of these weights will draw the needle-carriages toward and up to the fabric, each carriage in turn closely following the driver-blocks $B^{11}$ as they approach the opposite faces of the web, as substantially shown in Fig. 3. It will be noted from this figure that after each carriage has been drawn closely up to the web or fabric it remains in that position while the other carriage accomplishes its retrograde movement and until it again reaches the fabric.

It is necessary to the action of this class of machines that the needles shall be driven through the web from opposite sides alternately and that they shall be received and clamped in the carriage upon the side remote to their approach, which carriage then recedes, drawing the threads up until the stitch is fully formed in the web by a proper tension upon the threads. The instant this point is reached the movement of the needle-carriage must be reversed and it must return to deliver its needles, after driving their projecting portions through the web, to the other carriage, by which the operation described is repeated. To render these several actions wholly automatic, it is necessary that, after the one carriage has driven the projecting ends of the needles through the web and into the channels $f$ of the needle-bar mounted upon the other carriage and lying closely against the opposite face of the web, the clamping-bar $F^4$ upon the one carriage shall be released at substantially the same moment that the same part upon the other carriage is thrown down upon the needles. It may, however, in some cases be desirable that the needles should be clamped in the jaws of the carriage receiving them an instant before they are released by the jaws of the other carriage, and I have made provision for automatically effecting said operation in either way. It is also necessary, as I have already remarked, that each needle-carriage should cease its retrograde movement and return toward the fabric at the instant when the tension of the threads is such as to draw the stitch fully home on the fabric, since too slight tension will leave the stitches loose, while too strong a pull upon the threads will cause the fabric to "buckle," loosening the stitches which have been properly formed and ruining or greatly injuring the product of the machine.

I will first explain how I effect the automatic locking and unlocking of the needle-jaws, and will then describe the means whereby the reversal of the needle carriages is automatically effected.

Referring to Figs. 3, 7, 8, and 9 of the drawings, I have already shown how the needles are held in the channeled needle-bar $F^3$ by the clamping-bar $F^4$. This bar is carried by two arms, $F^5$, one at each end of the carriage, pivoted upon a shaft, $F^6$. To the extremities of these arms are attached spiral springs $F^{12}$, connected at the other end to the arm $F^2$ of the carriage. These springs, when the arm is free to yield to said springs, by their tension will raise the clamping-bar and release the entire series of needles. The clamping-bar is thrown down by a cam, $F^8$, rigidly mounted upon an axis, $f'$, journaled in a boss upon the arm $F^2$, the cam bearing against the under side of the rear portion of the arm $F^5$. Upon the axis $f'$ is rigidly mounted a crank-arm, $F^{14}$, the free end whereof is connected by a link, $F^{15}$, to the end of a lever, $F^{16}$, pivoted between its ends upon the arm $F^2$. The lower end of this lever extends down very nearly to the upper surface of the carrier-block F, and is pivotally attached to the end of a slide-bar, $F^{17}$, which rests upon the carrier-block and extends some distance beyond its forward end, as shown in Fig. 3, and is provided upon its lower edge with a square notch, $f^2$. Upon the upper end of the driving-block $B^{11}$ is formed a ridge or feather, $f^3$, which engages with the notch in the slide when the parts are in the position shown at the right hand of Fig. 3, with the clamping-bar locked down upon the needle-bar.

The construction thus far described is identical with that upon the remaining carrier-blocks; but it should be noted that the slides $F^{17}$ upon the same side of the machine are not in the same vertical plane, but are so placed that as the carrier-blocks approach each other the one slide will pass the other and lie side by side with it. (See Fig. 1.)

It may be noted at this point that the construction is such (as will hereinafter be described) that the adjacent ends of the carrier-blocks, when they most nearly approach each other, are separated by a space which is at least greater than the thickness of the driving-block $B^{11}$, as shown in Fig. 3, and this limit of separation may be increased or diminished, as circumstances may require, said interval of separation being controlled by the length of the stop-brackets $F^{18}$ and the carrier-blocks F, which engage with stops on the frame on which the tambour-frame is mounted.

Upon the upper surface of each of the carrier-blocks F, and in the same vertical plane with the slide-bar $F^{17}$ carried by the opposite block upon the same side of the machine, is formed a cam, $f^4$, located at or near the forward end of the block.

The parts being now substantially in the position shown in Fig. 3, in which the needle-carriage at the right has completed its retrograde movement and is about to approach the web, the operation will be as follows: Just before the needles of the approaching carriage reach the fabric the upwardly-curved end $f^5$ of the slide-bar $F^{17}$, mounted upon the stationary needle-carriage lying at the left hand of the web, as shown in Fig. 3, strikes the ridge $f^3$ upon the driving-block, raising the slide-bar and permitting said block $B^{11}$ to pass under it until the notch $f^2$, upon the lower edge of the slide-bar engages with the ridge $f^3$. At this instant the carriage upon the right hand of the fabric-frame in Fig. 3 has advanced so far that the projecting ends of the needles carried by it have been driven through the fabric and now lie in the channels of the needle-bar upon the opposite or left-hand side of the web, the needle-clamp upon the latter or stationary carriage having been raised and left open at the time said carriage was brought up to the web by drawing forward the slide-bar $F^{17}$ into the position shown in Fig. 3. The needle carriage in action having thus reached its limit of movement, it is arrested by means of stop-brackets $F^{18}$, (shown in Fig. 1,) mounted on the inner faces of the carriage-blocks F and abutting against the supports of the fabric-frame. At this instant the notches $f^2$ upon both slide-bars are in engagement with the ridge $f^3$ upon the driving-block, and as the movement of the carriage is arrested the driving-block $B^{11}$ leaves the carrier-block F and begins to traverse the space or interval separating it from the carrier-block upon the other carriage lying on the other side of the fabric. This movement produces opposite movement of the two slide-bars and opposite results in the clamping mechanism. During the time the driving-block is traversing this distance it performs the following functions: The slide-bar $F^{17}$ on the carriage which has just been arrested, (shown on the right hand of the web, Fig. 3,) and which said slide-bar has its notch $f^2$ engaging with the tooth $f^3$ on the block $B^{11}$, is by the stoppage of the carriage and the forward uninterrupted movement of the block drawn toward the opposite or receiving carriage, (on the left of the fabric, Fig. 3.) At or about the same time, however, the corresponding bar $F^{17}$ on the carriage last named has engaged its notch $f^2$ with the tooth upon the block $B^{11}$, and the latter slide-bar is therefore driven in a direction opposite to that of the bar upon the other carriage. This produces opposite action of the needle-clamping mechanism in the two carriages—that is to say, the sliding bar $F^{17}$ on the right-hand carriage, Fig. 3, is drawn forward and the needle-locking bar $F^4$ and arms $F^5$ are thrown up, releasing the needles, while the corresponding parts on the other needle-carriage are oppositely actuated, and thereby caused to lock the needles in the receiving-carriage on the left of Fig. 3. After the slide-bars have performed their function, the bar upon the right-hand or delivering carriage is released from the tooth $f^3$ in the following manner: As the driving-block $B^{11}$ approaches closely the end of the carrier-block F with which it is about to engage, the upwardly-inclined end $f^5$ of the slide-bar upon the arrested carrier-block is struck by the cam $f^4$ upon the opposite block, which lifts the slide, throws it off the driver-block, and leaves the latter free to effect the retrograde movement of the other carriage. The slide-bar thus released is left drawn forward into a position similar to that shown at the left of Fig. 3, with the needle-clamp raised and the parts in position to receive the needles from the other carriage upon its return, the slide-bar being also in position to engage with the ridge upon the driving-block and lock the needles in place the moment they are received.

By the mechanism thus described it will be seen that the clamping and unclamping upon the respective carriages is very nearly simultaneous, and for all practical purposes it may be called so.

It is understood that in addition to locking and unlocking the needles the function of the driving-block $B^{11}$ is to carry the needle-carriages away from the web. As said carriages approach the web they are held by the action of the weights $F^{14}$ closely against said blocks and the slide-bar $F^{17}$ being in engagement with the ridge or feather $f^3$, all liability of the needles being accidentally unlocked is avoided. Should it, however, be desirable to clamp the needles in the receiving carriage an instant before they are released from the other carriage, the slide-bars $F^{17}$ are slightly lengthened, so that when the clamp-bar is released the notched end of the lever will project farther beyond the forward end of the block F.

I have shown in Fig. 7 the clamping mechanism in one of its two different positions—that is to say, with the needles locked—whereas in Fig. 8 the same parts are shown as they appear when the slide-bar is drawn forward, and the needles released.

The best method which has thus far been discovered of effecting the automatic reversal of the needle-carriages is by means of the tension of the embroidering-threads, since the time of such reversal must not only depend upon effecting a tension proper for the stitch-formation, but such time must constantly change, since the successive reversals take place within intervals of time which constantly grow shorter, but do not diminish in any fixed ratio, for reasons explained in the opening portion of this specification.

It is not broadly new with me to effect the reversal by this method. Upon the 28th day of April, 1863, Letters Patent No. 38,358 were granted to Heaven and Smith, in which is shown a tension-bar resting upon the embroidering-threads, and rising and falling as these threads are drawn taut or slackened. By this movement of the bar, which extends across and rests upon all the threads carried by the machine, the reversing mechanism is operated. There are serious objections to the employment of such mechanism, which it is unnecessary to detail in this specification. I will, however, remark that it precludes the possibility of changing the tension of the threads, which may possibly be desirable for the production of different kinds of embroidery. Moreover, it is liable to cause a sudden increase in tension at any moment, which might injure or even ruin the finished product. This objection is due to the fact that such mechanism is at all times liable to a sudden and unexpected increase in friction, which may arise from many causes, and as this increased resistance must be overcome by the draft upon the threads it is evident that the objection is of a serious nature.

It is my purpose to produce the automatic reversal of the needle-carriages by the thread-tension, but to avoid the use of a tension-bar resting upon the threads, and by its own movement directly actuating the reversing devices. I also propose to so organize the mechanism that reversing devices may be brought into action by a comparatively light tension of the threads; to make the degree of tension required for the production of such a result adjustable, and to govern the reversing mechanism by devices which are wholly distinct from those actuated by the thread-tension, but which will respond promptly to the action of the latter and produce the successive reversals by a thread-tension which is in all substantial respects exactly the same throughout the entire operation of the machine.

I have already shown the manner in which the actuating-belts $B^3$ are driven, and in Fig. 1 have illustrated the two oppositely-revolving loose pulleys from which the movement is derived. The clutches $B^6$ and $B^7$, which are shifted into and out of engagement with the actuating-pulleys by means of the clutch-levers $B^8$ and $B^9$, are brought into action alternately in the manner and by the means following: To the power end of the lever $B^8$ is connected, by means of a link, $b^2$, the vertical arm of a bell-crank, $B^{14}$, pivoted upon any suitable support. To the extremity of the horizontal arm of said bell-crank is attached a belt, $B^{15}$, which is carried loosely around a pulley, $B^{16}$, and has its end secured to any suitable support, substantially as shown in Fig. 14, or at the right hand of Fig. 27. Upon a suitable support near said pulley is pivoted, by a bearing, $b^3$, (see Fig. 14,) located between its ends, a lever, $B^{17}$, having a forked end which is adjacent to the periphery of the pulley $B^{16}$, and in which is journaled an idle-roll, $B^{18}$. Upon the opposite end of the said lever is mounted an armature, $B^{19}$, and just opposite the same is arranged the core of an electro-magnet, $B^{20}$. The pulley $B^{16}$ is carried between friction-disks $B^{21}$, which are splined to the shaft $B^{22}$, (see Figs. 14 and 15,) carrying both, whereas the pulley is loose upon said shaft and is carried solely by the surface-friction of the inclosing-disks, the construction being substantially similar to that already described in connection with Fig. 28. If, now, the magnet is vitalized, the idle-roll $B^{18}$ will be thrown against the belt $B^{15}$, and sufficient frictional contact will thereby be given to enable the pulley to operate the bell-crank $B^{14}$, whereby the lever $B^8$ is actuated, the clutch $B^6$ engaged, and the shaft B revolved in one direction. When the circuit in which the magnet lies is broken, the belt $B^{15}$ will be released, and a spring, $B^{23}$, connected with the lever $B^8$, will throw said lever and shift the clutch $B^6$ out of engagement. The devices for bringing the other oppositely-revolving pulley into action are identical with those already described, and need not, therefore, be particularized here. I will merely call attention to the fact that, as in the other clutch-shifting mechanism of this character, the friction-pulley $B^{16}$ is adapted to slip between its carrying-disks $B^{21}$ after it has thrown the clutch, thereby retaining it in engagement with the pulley by a steady and unvarying strain upon the belt $B^{15}$ as long as the electric current flows through the coil of the magnet.

The frictional contact of the disks $B^{21}$ may be increased or decreased by forcing them with greater or less pressure against the faces of the pulley by means of disks $B^{21a}$, acted upon by nuts screwed upon the shaft $B^{22}$. For convenience of illustration I have lettered these parts in Figs. 14 to 17, inclusive, differently from the illustration in Fig. 28; but the construction is in all substantial respects the same.

Upon the same shafts $B^{22}$, (see Fig. 14,) with each of the slip-pulleys $B^{16}$, are mounted pulleys $B^{24}$, each driven by a cord or belt from a pulley, $B^{25}$, one of said driving-pulleys being upon the power-shaft $C^4$ and the other upon the counter-shaft C, Fig. 1, whereby continuous rotation is given to the pulleys $B^{16}$, which is only arrested by actuating the levers $B^{14}$ to the extreme limit, whereupon the draft upon the belt $B^{15}$ will slip the pulley between its friction-disks $B^{21}$, the shaft $B^{22}$ continuing its revolution without interruption. The circuits in which the two magnets $B^{20}$ lie pass through binding-posts $i$ $i'$, (see Fig. 4,) both mounted in a bracket, I, formed of any insulating material and attached to one of the central standards, $A^3$. Between these posts vibrates the extremity of a pendulum-lever, $I'$, pivoted between its ends upon a stud, $I^2$. Upon the lower end of said lever is attached a non-conducting tip, $i^2$, upon which is mounted a contact-point, $i^3$, to which is attached a conducting-wire, $m$.

Between the bearing for the pendulum-lever and the standard, the stud $I^2$ is provided with a knife-edge, upon which is mounted a plate, $I^3$, having at its lower end a collar, $I^4$, provided with a central orifice which slips over and rests upon the knife-bearing, as shown in Fig. 6. Near the upper end of the plate is centrally attached a pin, $i^4$, to which is connected a wire, $I^5$, having a ring or eye, $i^5$, which passes around the collar of the plate. To this ring is connected a spiral spring, $1^6$, which is fastened to a pin, $i^6$, beneath, sufficient tension being given to the spring to cause the wire to draw with more or less force upon the pin $i^4$.

Near the upper end of the plate $I^3$ is cut a slot, $i^7$, lying in the arc of a circle described from the stud $I^2$ as a center. This slot receives a pin, $i^8$, projecting from the upper end of the pendulum-lever $I'$. It will now be seen that by rocking the plate $I^3$ upon its support until the pin $i^4$ passes the vertical line drawn through the knife-edge supporting said plate the tension of the spring $1^6$ will tilt it in the same direction until the extremity of the slot $i^7$ strikes the pin $i^8$, whereupon the pendulum-lever $I'$ will move with it until the contact-point $i^3$ strikes one of the posts $i$ or $i'$. I will now describe the means by which this change is automatically effected and the results produced by it.

In the upper end of the plate $i^3$ is formed a shallow fork, having branches $i^9$ and $i^{10}$, as shown in Figs. 4 and 6. Between these lies the extremity of the reversing-lever $I^7$. This device is shown in part in Fig. 5, and in detail in Fig. 10, and in elevation in Fig. 2, its construction being separately illustrated in Fig. 12. It consists of the straight portion $I^7$, which projects through an opening in the standard $A^3$ and makes engagement with the forked end of the plate $I^3$. Upon the inner end thereof is formed a flat L-shaped plate, $I^8$, provided with the slots $i^{11}$ and $i^{12}$, one in each branch of said plate. A separate portion, $I^9$, having a pin, $i^{13}$, which is placed in the slot $i^{11}$, forms a T-head upon the lever, as shown in Fig. 10. This separate plate is provided with a slot, $i^{14}$, lying in the same straight line with the slot $i^{12}$.

Projecting horizontally from the inner side of the standard $A^3$ (see Figs. 2 and 10) is a bracket, $I^{10}$, having two parallel arms, $i^{15}$, projecting from its solid portion. The T-head of the lever lies flat upon said bracket, supported partly by the solid portion and partly by the parallel arms $i^{15}$. Upon each of these arms is pivoted a lever $I^{11}$, having one end extended to lie beneath the cross-head of the reversing-lever, said ends being connected thereto by set screws $i^{16}$, passing through the slots $i^{12}$ and $i^{14}$, and tapped into the ends of the levers. Upon the opposite side of their pivotal points said levers are extended until they pass the edge of the fabric or web W a greater or less distance, as circumstances may require, and upon the inner extremity of each is pivotally mounted a flat plate, $I^{12}$, which lies parallel with the web W, one of said plates being arranged upon or opposite each surface of said web. It will be seen that by moving either one of these plates away from the fabric the registering-lever $I^7$ will be thrown in the opposite direction, thereby throwing the forked plate $I^3$ over in the manner already described and breaking the circuit through one of the posts, as $i$, and making circuit with the opposite post, $i'$. It will be remembered that one of these posts is in circuit with one of the electro-magnets $B^{20}$, Figs. 1, 14, and 15, and the other post is in the same circuit with the other and similar magnet $B^{20}$, and that by the making and breaking of these circuits alternately the clutch-shifting levers $B^8$ and $B^9$ are operated to engage and disengage the locking-clutches $B^6$ and $B^7$ alternately with the oppositely-revolving pulleys $B^4$ and $B^5$, whereby the reversal of the driving-shaft B is effected. The make and break of these circuits is effected by the reversing-lever described, which is automatically actuated as follows:

As each needle-carriage recedes from the fabric and produces tension upon the threads, there will always be a slight swaying of the fabric, caused by said tension. This movement will be amply sufficient to throw one or other of the plates $I^{12}$ far enough to actuate the reversing-lever $I^7$ in the manner already set forth. Moreover, it will readily appear that by a simple adjustment of the set-screws $i^{16}$ in the slots $i^{12}$ and $i^{14}$ of the cross-head of said lever the plates $I^{12}$ may be set closer to or farther from the fabric W, and the reversal thereby effected by a very light or by a very strong tension, and that the same may in a similar manner be varied to any degree between the two extremes. This method of effecting an automatic reversal of the needle-carriages is of importance, in view of the fact that the reversing-lever is operated by a force so slight that I do not consider it necessary to extend the tension-plates $I^{12}$ from side to side of the web in order to equalize the tension upon the threads throughout the series. This may of course be done, if desired; but the power required to effect the movement of the reversing-lever is so slight that when properly constructed the tension-plates may be placed near either end of the web, as shown, without producing any perceptible increase in the thread-tension upon that part of the fabric. After each operation of the reversing-lever $I^7$ it is restored to a central position, and the tension-plates $I^{12}$ are returned to their proper location relatively to the web by means of leaf-springs $i^{17}$, which are mounted upon the arms $i^{15}$, carrying the levers $I^{11}$, and bear against the inner or adjacent edges of the latter. The movement of the reversing-lever necessary to effect each reversal is comparatively very slight, since the moment the rocking plate I³ has been moved just beyond the vertical the spring I⁶ will throw it the remainder of the distance. The main object of the construction is not to obtain increased power, but to avoid the exertion of power by the embroidering-threads, and to vibrate the plate throughout its limit of movement with the least possible movement of the reversing-lever I⁷.

In order to render the action of the pendulum-lever I' certain, and prevent it from being prematurely vibrated by friction upon the plate I³, or by other causes, the upper end of said lever is made of greater length and weight than the lower, and the superior gravity of that portion above the supporting-stud will retain it in either position until it is acted upon by the plate I³ in the manner described.

I have illustrated in Fig. 13 a modified form of the devices by which the plate I³ is vibrated, the parts being, with the exception of the reversing-lever I⁷ and its connections, identical with those already described. As a substitute for said lever, I pivot upon a suitable support, $i^{18}$, a trigger-arm, I¹³, carrying a horizontal bar, I¹⁴, which rests upon the embroidering-threads. The trigger-arm has a tail-piece, I¹⁵, to which is connected a slotted quadrant, I¹⁶, which is hung from the pivot $i^{18}$ by a bar, $i^{19}$. A set-screw, $i^{20}$, passes through the slot in the quadrant and into the tail-piece, whereby the trigger-arm may be so adjusted as to cause the bar I¹⁴ to engage with the threads at different points. Upon a pivot, $i^{21}$, is mounted a short lever, I¹⁷, one end of which lies between the forks of the plate I³, while the other rests against the lower end of the bar $i^{19}$. Now as the threads are drawn taut the bar I¹⁴ will rise, and the end of the arm $i^{19}$ will be thrown toward the web, thereby operating the lever I¹⁷ and rocking the plate I³. If this modification is employed, it is evident that a duplicate apparatus must be placed at the other end of the web, to be actuated by the threads as they pass through the web in the opposite direction.

I have already called attention to the fact that the adjustment of the fabric-frame must be fully completed before the needles touch or very closely approach the web. As the process of embroidering goes forward and the threads shorten, it may happen that the needle-carriages will be so reciprocated after such brief retrograde movements that they will again present the needles to the fabric before the adjusting mechanism has had time to complete the stitch adjustment. In order to prevent any possibility of the needles being from this cause driven into the fabric while it is in motion, I have combined with the reversing mechanism above described means for effectually obviating all possibility of such an accident.

In the lower part of the standard A³, a little above the insulating-support I, (see Fig. 4), I seat in a slot or other suitable support a plate or bar, G. From this bar project two pins or studs, $g$, straddling the lower end of the pendulum-lever I', and which, by the sliding of the bar in one direction or the other, will vibrate said lever from one post, $i$ or $i'$, to the other. The slide-bar G is normally held in such position that it will not interfere with the operation of the pendulum-lever, being so retained by springs G' at each end, by which also it is restored to position after movement in either direction.

Pivoted upon the slide-bar G, near each end, is a rod, G², said rods extending in opposite directions and lying in the same vertical plane with the driver-block and carrying-blocks B¹¹ and F. Near the free end of each rod G² is formed an eye which receives a cord or wire, G³. The latter are carried upward, as shown in Fig. 3, and connected to the same bell-crank, E²⁶, (see Fig. 2,) to which the wires E²⁵ are attached, the arrangement being such that when the shifting-lever E²⁰ has thrown the clutch E¹⁹ into engagement with the pulley driving the stencil, by which the stitch adjustments are controlled, the horizontal arm of the bell-crank E²⁶ (which remains lowered as long as the clutch engagement continues, and as long, therefore, as the fabric is moving) will slacken the wire G³ and lower the end of the rod G² into the path of the ridge $f^3$ upon the driving-block B¹¹. On the other hand, the moment the clutch is disengaged the bell-crank is restored to its normal position and the rods G² are at once raised. I have shown in Fig. 4 a portion of one of the carrier-blocks F, together with the driving-block, to fully illustrate the operation of the parts described. Now if the case be such that either carriage has approached the fabric so nearly as to endanger the needles entering it while it is still in motion the ridge $f^3$ upon the driving-block will engage with the end of the rod G², slide the bar G, and throw the contact-point $i^3$ upon the pendulum-lever from one post, $i$ or $i'$, to the other, as the case may be, thereby effecting an instantaneous reversal of the mechanism driving the needle-carriages, and causing the approaching carriage to again recede from the web, this action, however, in no respect interrupting the operation of the devices by which the stitch adjustment is effected. In fact, the same needle-carriage may in this manner repeatedly approach and recede from the fabric pending the complete adjustment of the latter, upon which the needles will be driven through and delivered to the other carriage, and the operation go forward as usual. As the needle-carriages approach the limit of their retrograde movements, and the threads are subjected to an increasing tension, it is necessary to employ means for preventing them from being withdrawn from the eyes of the needles.

Referring to Figs. 7 and 8, the reference-letter L indicates an arm pivotally mounted upon the same shaft carrying the needle-clamping levers $F^5$, there being, of course, an arm at each end, or near each end, of said shaft, as shown in Fig. 1. The arms L are rigidly mounted upon the said shaft $F^6$, and turn with it, whereas the clamping-levers $F^5$ are loose upon the shaft, thereby permitting the latter to turn without in any manner affecting the position of said levers. The arms L extend somewhat beyond the forward extremities of the clamping-levers, and upon their ends is mounted a strip or bar, L′, which closes down upon the needles directly in front of the clamping-bar $F^7$. A strip of elastic material, $l$, may be attached to the edge of the plate L′, which lies directly upon the eyes of the needles.

Upon each end of the shaft $F^6$ is rigidly mounted an arm, $L^2$, and upon said shaft is coiled a spiral spring, $l^2$, (see Fig. 1,) by which the bar $L^2$ is normally thrown down and pressed with some force upon the needles. As the needle-carriage approaches the fabric, this arm $L^2$ encounters the end of a horizontal stop-bar, $L^3$, (see Fig. 1,) thereby throwing up the holding-bar L′ into the position shown in Fig. 8, releasing the threads and allowing the entire projecting portions of the needles to be driven through the fabric. As the needle-carriage recedes from the web, the arm $L^2$ is withdrawn from engagement with the stop-bars $L^3$, and is by the tension of the spring $l^2$ brought down upon the threads. By these means the threads are fastened in the needles at all times, save when the carriages are in close proximity to the fabric. As the threads are at this point under no tension whatever, the fastening-bar can be removed without the slightest danger.

The foregoing description comprises all the essential steps in the operation of the machine whereby a design is produced upon a web or fabric. It does not include, however, means for the production of a finished design in those cases wherein openings of different size and arrangement form part of the pattern, nor in those wherein a "button-hole" stitch is employed for finishing or producing some particular portion of the design. I will now describe, therefore, the means which I have invented for automatically accomplishing both these results.

Referring to Fig. 2, the vertical standards $A^3$ being joined at the top by a horizontal bar, $A^2$, I mount upon said standards a frame consisting of two vertical posts, N, connected together not far from their central portions by a horizontal bar, N′. The lower portion of each post is channeled to fit over and move vertically upon the standards $A^3$. In the lower end of each post N is swiveled a screw, $n$, having a hand-wheel or nut, $n'$, turned upon it, the hub of each wheel having bearing between bosses $n^2$, mounted upon the standard $A^3$. By turning these hand-wheels or nuts the frame N N′ may be adjusted upward and downward; and for the purpose of giving an equal adjustment at each end a scale is preferably marked upon each of the standards $A^3$, whereby the horizontal bar N′ may be brought into exact parallelism with the horizontal members of the fabric-frame, and consequently with the fabric supported thereby. In the upper extremities of the posts N are formed bearings $n^3$ for a shaft, $N^2$, having upon one end a pulley, $N^3$, which is driven by a cord or belt from a pulley, $N^4$, upon the counter-shaft C, Fig. 1.) Upon the opposite end of said shaft is mounted a miter-gear, $n^4$, (see Figs. 2 and 19,) which meshes with a second miter-gear, $n^5$, mounted upon a vertical shaft having bearing in a boss, $n^6$, upon the post. This shaft carries upon its lower end a disk, $N^5$. (Shown in detail in Figs. 21 and 22.) Upon this disk is mounted a wrist-pin, $n^7$, which is adjustable in a slot, $n^8$, toward and from the center of the disk. This wrist pin carries a pitman, $n^9$, by which a rack-bar, $N^6$, is reciprocated, said rack-bar being supported upon the horizontal bar N′ and having its end projected through and guided by one of the posts N. For the purpose of guiding this rack it may have a rib or feather upon its under side fitting within a channel in the supporting-beam.

The cutters are supported upon and are fed and operated by the rotation of the shaft $N^2$. They consist, as shown in Fig. 20, of two arms, $N^7$ and $N^8$, having such length that the fabric W lies between their lower extremities. These arms are coupled together at their upper ends by a headed bolt, $n^{10}$, having a thumb-nut, $n^{11}$, turned upon its threaded end. A set-screw, $n^{12}$, is tapped through the arm, just below the connecting-bolt, and bears against the end of the opposite arm. By these means the connected ends may be set at different distances apart, in order to secure a perfect stroke at the cutting extremities. Between their ends the arms are curved outward, and within the space thus formed is placed a ring, $n^{13}$, having a finger by which it is pivotally attached to the arm $N^8$. Within this ring is seated an eccentric, $n^{14}$, which is splined to the shaft $N^2$, and which at each revolution opens and closes the lower extremities of the arms.

Upon each side of the arms $N^7$ and $N^8$, but attached to one only, are supporting blocks $N^9$, extended laterally and resting upon the shaft, to give steadiness to the arms and prevent vibration of their lower extremities. Through one of these blocks is tapped a set-screw, $N^{10}$, bearing upon a plate, $n^{15}$, which lies upon the shaft, whereby the friction may be varied as may be necessary to prevent the cutting-arms being carried by their momentum, as they are advanced upon the shaft, beyond the length of the actual feed movement.

Upon one of the blocks $N^9$ is pivoted a pawl, $n^{16}$, lying between the arms $N^7$ and $N^8$, and having engagement with the rack $N^6$. When the latter is moved in one direction, the pawl will ride over its teeth; but when moved in the opposite direction it will engage with the rack and will carry the cutting-arms with it as far as the rack moves. The length of this feed movement may be varied by adjusting the movable wrist-pin $n^7$ in the slotted disk $N^5$; and to aid the operator in making such adjustment a graduated index may be marked upon one margin of the slot, as shown in Fig. 21. Toward their lower ends the cutting-arms are curved inward until their ends nearly meet. In the extremity of one arm is detachably mounted a cutting-tool or punch, $n^{17}$, which may be simply tapped into said arm in order that it may be readily removed and a different tool substituted. In the opposite arm is mounted a cutter-block, $n^{18}$. (Shown upon an enlarged scale in Fig. 23.) This block is hung upon gimbals, in order that it may, under all circumstances, have true engagement with the cutting-punch.

The interval between the teeth of the rack $N^6$ is exactly equal to the distance between one needle and another in the needle-carriages below; but by varying the throw of the pitman $n^9$ the cutters may be fed at each movement a distance equal to two or more of such intervals. The arrangement of parts is such that the feed of the cutters takes place as the arms are separated by the eccentric $n^{14}$, and the cutting is done an instant after such feed ceases.

The cutting-tool may consist of a single punch of any desired size, or of a group of such perforators arranged in any manner. By such interchangeable tools and by adjusting the feed to the requirements of the pattern any design may be perforated automatically, no special skill being required for the adjustment of parts.

In many of the varieties of embroidery sold upon the market it is customary to form some portion of the design by means of what may be termed a "button-hole" stitch. This stitch is generally formed by hand, and possibly in some cases by mechanical devices; but I have combined with the embroidering mechanism heretofore described automatic devices of the simplest character for producing this variety of work. The devices which I have invented for this purpose are shown in Figs. 2 and 24 of the drawings, and the mechanism for giving automatic operation thereto is illustrated in Fig. 4 and upon a smaller scale in Fig. 3. These devices consist, essentially, of a series of leaf-plates, P, made of any suitable material, which are separately mounted upon a horizontal shaft, P', which has support in the side standards, $A^3$, in such position that the series of leaves or plates hang from the shaft in immediate proximity to the right side of the web, each leaf rocking or swinging freely upon the shaft. Instead, however, of making these leaf-plates separately, I may employ a single plate extending from end to end of the web; but I prefer the construction shown.

Upon the lower end of each plate is centrally mounted a point or hook, $P^2$, and instead of a single point mounted upon each plate I may use two, three, or more, as shown in Fig. 2. In any case I employ as many of these hooks as there are needles, and arrange them at the same intervals apart. It should be noted, however, that in case the pattern requires it I may use only half the said number of hooks, or any other portion thereof, operating them in conjunction with every alternate needle—every third, fourth, or fifth needle, &c. Each hook is curved laterally, as shown in the right-hand part of Fig. 24, that it may make engagement with the thread after the latter has been carried through the web and retain it until the operation now to be described has been accomplished. The shaft P' is supported at each end by devices shown in Figs. 4 and 5. These devices are substantially the same at each end of the shaft, and consist of a multiple cam-wheel, $P^3$, having upon its periphery a series of similar cams, $p$, and upon its inner edge a separate series of cams, $p^3$. Each of these wheels is mounted upon a stud, $P^4$. The ends of the shaft P' rest upon the peripheral cams of the wheels, and rise and fall vertically as said wheels revolve simultaneously, the shaft being guided by vertical slots in the standards $A^3$. As the wheels turn, the shaft rises continuously till its ends ride upon the highest portion of each cam $p$, and upon further movement it reaches the shoulder $p^2$, when it drops to the lowest point of the next succeeding cam.

The cam-wheels $P^3$ have intermittent movement at regular intervals, and are arrested at the moment when the ends of the shaft are resting upon the highest part of each cam, and at each movement of said wheels are carried from such point over the shoulder $p^2$ and up to the top of the next cam, where they remain during the time the wheels are at rest. The edge of the wheel shown in Fig. 5 is also divided into a series of irregular but similar surfaces, which engage with a striker-block, $P^5$, mounted upon the shaft. These edge cams, $p^3$, move the shaft P' in one direction longitudinally, and it is thrown in the opposite direction by a spring, $P^6$, there being no edge cam upon the wheel which carries the opposite end of the shaft.

The movement of the wheels is effected by the following means: Upon the face of each wheel is rigidly affixed a ratchet, $P^7$, concentric with the cam-wheel. On a boss, $P^8$, projecting laterally from the standard $A^3$, is pivoted a lever, $P^9$, carrying upon its upper end a pawl, $P^{10}$, which is held by a spring, $P^{11}$, in mesh with the teeth of the ratchet. Upon the lower end of the lever is pivoted a trigger-foot, $P^{12}$, having a lap end, $p^4$, which lies against the outer side of the foot of the lever. The length of the trigger-foot is such that it lies in the path of the driving-block $B^{11}$. The construction described, however, permits the block to pass as it approaches the standard without moving the lever, the trigger-foot simply turning upward. As the block returns, it makes an operative engagement therewith, and the ratchet is turned the distance of a single tooth. The lever is restored to position by a spring, $P^{13}$.

The mechanism for actuating the cam-wheel at the other end of the shaft is identical with that just described.

The movement produced by the cam-wheels is substantially indicated in Fig. 24, the left-hand part thereof showing the normal position of the leaf at the moment the needle enters the fabric, while the right-hand portion indicates, by the position of the threads, the movement imparted by the cam-wheels $P^3$ to the leaves carried by the shaft $P'$.

Upon the back of each hook-carrying plate P is mounted a light spring, $P^{13}$, having very delicate tension, whereby the lower end of the leaf is thrown outward a little and away from the surface of the web, the purpose being that after the hook $P^2$ has dropped a loop it shall spring out from the fabric far enough to move into proper position for the next stitch without taking up the loop it has just dropped.

The manner of forming the stitch is essentially shown in Fig. 24, in which the letter $t$ indicates the thread which has just been caught by the hook $P^2$ and carried upward and to one side, forming the loop which is held upon said hook.

The movement of the fabric-frame to adjust it for the next stitch takes place while the parts are in this position, and thereupon the edge cam of the wheel $P^3$ throws the whole series of leaves toward the left of the figure, Figs. 2 and 24, releasing the loops from the hooks $P^2$, which at once spring outward. Almost immediately thereupon the peripheral cams on the wheels $P^3$ drop the shaft $P'$, bringing all the leaves P down to their lowest position, as shown in Fig. 2. The motion last described, however, does not take place until the needles have passed through the fabric in the formation of the new stitch. The operation thereafter is substantially a repetition of that already described.

Heretofore in the production of embroidery of any kind from a given design it has been impossible to reduce the size of the design without making a corresponding alteration in or modification of the pattern from which it is produced. The reason for this is so apparent to those skilled in the art as to require no repetition here. I have, however, devised an extremely simple mechanism whereby the size or relative proportions of the product may be increased or decreased to any required degree without changing the pattern. In other words, the same design may be produced in a series of different sizes, from the smallest to the largest, by the use of the same pattern sheet or "stencil." This result I effect by belting the shaft $E^{16}$, (see Fig. 2,) from which the stencil is driven, to the power-shaft $C^4$ by means of cone-pulleys $E^{17}$ and $E^{18}$, reversed relatively to each other. It will be seen that by belting from the larger pulley above to the smaller pulley upon the shaft $E^{16}$ the stencil-sheet S will be driven at a high rate of speed and the stitch-adjustments affected by it, and which are in degree exactly proportioned to the length of the perforations of the sheet, will be diminished, since although the speed of the stencil-movements may be varied the speed of the several pulleys by which the adjustments of the fabric-frame are effected is always the same; or, if it varies at all, varies with the speed of the stencil, since all these parts derive their motion from the same power-shaft. By this apparatus the same stencil may be used to form designs of every possible size, from the largest to the most minute, the same pattern being reproduced in each.

I have shown in Fig. 26 a diagram illustrating the manner of constructing the stencil shown in Fig. 25 from any given pattern. For the purpose of this explanation let it be supposed that the said diagram represents a fractional part of a pattern from which a stencil is to be cut to reproduce said pattern upon a fabric. It is required now to cut in the stencil perforations, which will give the adjustments of the fabric-frame necessary for the production of, for example, the stitch S' in the diagram; it being remembered that the latter is considerably enlarged relatively to the actual stitch produced in the embroidered design. By examining the equal divisions of the diagram it will be seen that the production of this single stitch requires two adjustments of the fabric-frame—namely, one to the right for three spaces and another downward for two spaces. Now, by referring to the plan of the stencil in Fig. 25 it will be seen that the perforations marked 4 and 5 will produce both these adjustments, the former giving movement of three spaces to the right and the latter a vertical displacement of two spaces or divisions measured on the diagram. As the final position of the fabric will be merely the resultant of the two separate movements, both adjustments may be made simultaneously, as already explained. In a similar manner the whole series of stitches required to form a pattern may be laid off upon the stencil in a very short space of time, and when the perforations therein are cut the latter will constitute an intelligible pattern-sheet, which may be repeatedly used for the production of an indefinite number of similar designs, varying in size if desired, in the manner already described.

Although I have in this case shown a stencil-sheet for controlling the stitch adjustment automatically, I do not broadly claim such a device in this application, such broad claims being presented in a separate application filed by me the 25th day of March, 1887, Serial No. 232,375. The claims in the present application are limited to the peculiar construction of stencil shown and described, having four series of openings representing the two vertical and two longitudinal or horizontal adjustments of the tambour-frame, and provided with a fifth series of openings for continuing the progressive movement of the stencil after the same is initiated, and arresting its movement after each stitch adjustment is effected by it. I also claim said stencil in the several combinations wherein it appears as an element in connection with the circuit breaking and closing devices shown and described.

Having thus fully described my invention, what I claim as new, and desire to secure by Letters Patent of the United States, is—

1. In an embroidering-machine, the combination, with a movable fabric-frame, of threaded vertical shafts and a threaded horizontal shaft engaging with the supports upon which said frame is mounted, belt-gearing connecting the vertical shafts to give them simultaneous rotation, pulleys mounted upon the horizontal shaft and upon one of the vertical shafts, driving-pulleys geared therewith, clutches by which said pulleys are brought into operation, electro-magnets by which the clutch-shifting levers are actuated, and a perforated sheet formed of any suitable non-conducting material, whereby the circuits in which said magnets lie are made and broken, substantially as specified.

2. In an embroidering-machine, the combination, with a fabric-supporting frame and shafts by which the fabric-frame receives adjustment, of pulleys mounted loosely upon continuously-revolving shafts, clutches splined on said shafts, clutch-shifting levers, each carrying an armature, and electro-magnets which actuate said levers, their circuits being made and broken by automatic mechanism, substantially as specified.

3. In an embroidering-machine, the combination, with a movable fabric frame and the mechanism by which the successive stitch adjustments are effected, of gearing actuating said mechanism, clutches by which said gearing is brought into action, and electro-magnetic devices by which each clutch is shifted by the make and break of an electro-magnetic circuit, substantially in the manner specified.

4. In an embroidering-machine, the combination, with a vertically and laterally adjustable fabric-frame, of threaded shafts for giving the successive stitch adjustments, a stencil-sheet having as many distinct series of longitudinal openings as there are different adjustments of the fabric-frame, each opening having a length which defines the degree of the stitch adjustment, and electro-magnets lying in circuits which are made and broken by the progressive movement of said stencil, substantially as specified.

5. In an embroidering-machine, the combination, with a fabric-frame and the mechanism whereby the needle-carriages are moved toward and from the web or fabric, of reversing mechanism actuated by a reversing-lever, and tension-plates swinging said lever and lying adjacent to each surface of the web, whereby the swaying of the web produced by the tension of the threads effects the reversal of each needle-carriage, substantially as specified.

6. In an embroidering-machine, the combination, with a fabric-frame and mechanism for moving the needle-carriages, of reversing devices operated by a contact-lever having tension-plates lying against or adjacent to the opposite faces of the web, a shifting-lever throwing the clutch whereby the reversal is effected, and an electro-magnet actuating the shifting-lever, said magnet lying in a circuit which is made by the vibration of the contact-lever, said vibration being produced by the swaying of the web caused by the tension of the embroidering-threads, substantially as specified.

7. In an embroidering-machine, the combination, with a fabric-supporting frame, threaded shafts upon which said frame is supported, and pulleys by which said shafts are connected, of an electro-magnet vitalized by the making of a circuit within which said magnet lies, an arm vibrated by the attraction of said magnet, and a clutch splined upon a continuously-revolving shaft and thrown by the vibration of the arm into engagement with a pulley loosely mounted upon said shaft, said pulley being belted to a pulley on one of the shafts supporting the fabric-frame, substantially as specified.

8. In an embroidering-machine, the combination, with a fabric-supporting frame, threaded shafts upon which said frame is supported, and pulleys by which said shafts are connected, of an electro-magnet vitalized by the making of a circuit within which said magnet lies, an arm vibrated in one direction by the attraction of said magnet and in the opposite direction by a spring or its equivalent, a clutch splined upon a continuously-revolving shaft and connected with one end of said lever, a pulley loosely mounted upon said shaft, and a non-conducting sheet having progressive movement and provided with a series of longitudinal openings, whereby the magnet is automatically vitalized and devitalized, substantially as specified.

9. In an embroidering-machine, the combination, with needle-carriages which alternately approach and recede from the web or fabric, of a shaft from which such movement is derived, pulleys loosely mounted upon said shaft and belted to a power-shaft to have rotation in opposite directions, clutches splined upon the shaft carrying said pulleys, levers by which the clutches are thrown into engagement with the pulleys alternately, electro-magnets which when vitalized actuate said levers, and a perforated stencil-sheet having progressive movement, whereby the circuits in which said magnets lie are made and broken automatically, substantially as specified.

10. In an embroidering-machine, the combination, with the needle-carriages by which the embroidering-needles are carried, of a needle-bar having formed therein needle-holding channels or slots arranged at regular intervals, each channel increasing in width from its lowest point upward, and a needle-clamping bar pressing the needles into said channels, substantially as specified.

11. In an embroidering-machine, the combination, with the needle-carriages by which the embroidering-needles are carried, of a needle-bar having formed therein channels or slots at equal intervals, in which the needles rest, and a clamping-bar having an elastic strip which rests upon and holds the needles in said channels, substantially as specified.

12. In an embroidering-machine, the combination, with a needle-carriage by which the embroidering-needles are driven and the threads drawn taut, of a thread-fastening bar lying in front of the needle clamping bar, and arms carrying said fastening-bar, whereby the latter is caused to rise and fall as the carriage approaches and recedes from the web or fabric, substantially as specified.

13. In an embroidering-machine, the combination, with the needle-carriage having a suitable needle-bar, of a clamping-bar by which the needles are held, a thread-fastening bar lying in front of the clamp and having an elastic surface which lies upon the central portion of the needles, spring-actuated arms carrying said fastening-bar, and stop-arms by which the latter is raised as the needles closely approach the fabric, substantially as specified.

14. In an embroidering-machine, the combination, with the needle-carriage having suitable clamping mechanism, of a thread-fastening bar having an elastic or yielding surface adapted to lie upon the central portions of the needles to prevent the withdrawal of the threads, substantially as specified.

15. In an embroidering-machine, the combination, with a needle-carriage having a needle-clamping bar carried by arms pivoted upon the carriage, of cams mounted upon a rock-shaft by which the clamp is thrown into locking engagement, levers pivotally mounted upon the needle-carriage and actuating said cams, notched slide-bars connected with said levers, a driving-block having a tooth or feather which engages with the notch in the slide-bars, and a traveling belt by which the driving-block is carried from end to end of the machine, substantially as specified.

16. In an embroidering-machine, the combination, with two needle-carriages, one upon each side of the web or fabric, of cords and pulleys whereby each carriage is normally drawn toward said web, a belt or chain upon each side of the machine, having a driving-block rigidly mounted thereon, slide-bars resting upon the foot-pieces of each needle-carriage and having a notched forwardly-projecting portion which normally engages with a tooth or feather upon the driving-block, levers pivotally mounted upon each carriage and actuating the needle-clamps, cams upon the foot-pieces of each carriage whereby the notch of the slide-bar is thrown off the tooth of the driving-block, and stop-arms which limit the forward movement of each needle-carriage, whereby the unlocking of the needles in one carriage and the locking of the same in the other is rendered automatic and substantially simultaneous, substantially as specified.

17. In an embroidering-machine, the combination, with two needle-carriages, one upon each side of the web or fabric, of belts or chains by which a retrograde movement is given to the said carriages, a shaft driving said belts, reversing mechanism connected with said shaft, and a reversing-lever having plates which lie upon each side of the web and are thrown in opposite directions alternately by the swaying of the web produced by the tension of the embroidering threads, substantially as specified.

18. In an embroidering-machine, the combination, with a fabric-frame and a driving shaft having pulleys or sprockets, of belts or chains driven thereby, pulleys loosely mounted upon said shaft and revolving in opposite directions, clutches splined upon the shaft and adapted to engage alternately with said pulleys, shifting-levers connected with said clutches, and a reversing-lever having tension-plates lying upon opposite faces of the web or fabric, said lever being vibrated by the swaying of the web produced by the tension of the threads, substantially as specified.

19. In an embroidering-machine, the combination, with a fabric-frame and the mechanism by which the needle-carriages are moved, of a reversing apparatus consisting of a pendulum-lever connected at its upper end to a vibrating plate, a spring connected with said plate and attached to a pin below the point of support of the latter, and tension-plates connected with the reversing lever and adjustable toward and from the web, substantially as specified.

20. In an embroidering machine, the combination, with a fabric-frame and the mechanism whereby the needle-carriages are receded from the web, of a reversing lever operated by tension-plates lying upon or adjacent to the opposite faces of the web and thrown in opposite directions by the swaying of the web as the threads are drawn taut, substantially as specified.

21. In an embroidering-machine, the combination, with a fabric-frame and a reversing-lever pivotally mounted upon one of the side standards supporting the fabric-frame, of a vibrating plate balanced upon the pivotal support of said lever, a spring under tension having its terminals one below said support and in a vertical line drawn through it and the other in the central upper portion of said plate, an arm having one extremity lying in a fork on said plate, and tension-plates connected with the opposite extremity and adapted to be moved in opposite directions alternately by the swaying of the web, substantially as specified.

22. In an embroidering-machine, the combination, with a fabric-frame and a vibrating reversing-lever, of tension-plates connected therewith and lying upon each side of the vertically-suspended web, and means, substantially as described, whereby said plates may be adjusted toward and from the web, whereby the thread tension required to effect the reversal may be varied, substantially as specified.

23. In an embroidering-machine, the combination, with a fabric-frame and a reversing-lever which is vibrated by the swaying of the web as the threads are drawn taut, of two separate battery-circuits, each passing through a binding-post arranged beside the lower end of a pendulum-lever, which is swung by the action of the reversing-lever, a binding-post upon the lower non-conducting end of said pendulum-lever, which is thrown by the swing of the latter from one of said binding-posts to the other, thereby breaking the one circuit and making the other, electro-magnets lying in each of said circuits, armatured levers actuated by said magnets, and devices connected with said levers for locking the oppositely-revolving pulleys alternately to the shaft moving the needle-carriages, substantially as specified.

24. In an embroidering-machine, the combination, with a fabric-frame mounted upon a movable support, of threaded shafts engaging with said support, a pulley belted to one of said shafts, two oppositely-revolving pulleys, one upon each side of said pulley and upon the same shaft, splines for locking the central pulley with one of the adjacent pulleys and with the shaft simultaneously, thereby giving rotation in either direction to the central pulley and to the pulley on one of the threaded shafts giving adjustment to the fabric-frame, a series of electro-magnets, each in a separate circuit, a stencil-sheet having openings which represent the degree and kind of adjustment by their length and relative arrangement, a conducting-bar above and spring-fingers beneath said stencil, whereby as the latter is fed forward the several circuits in which said fingers lie are made and broken, and conducting-wires connecting said fingers with the coils of the several magnets, substantially as specified.

25. In an embroidering-machine, the combination, with a conducting-bar and with fingers which normally make contact therewith, of a stencil or perforated sheet which is fed between the bar and the fingers, a series of electro-magnets, each in circuit with one of said fingers, oppositely-revolving pulleys loose upon the shaft actuating the needle-carriages, clutches by which either of said pulleys may be locked with the shaft and caused to actuate the same, needle-carriages belted to the shaft carrying said pulleys, and clutch-shifting levers having armatures which are attracted by said magnets, substantially as specified.

26. In an embroidering-machine, the combination, with a fabric-frame and the mechanism by which the several adjustments of the fabric-frame are effected, of a stencil-sheet having openings which control the degree of adjustment, and gearing for driving said stencil at different rates of speed relatively to the constant speed of the adjusting mechanism, substantially as specified.

27. In an embroidering-machine, the combination, with the vertical frame and the fabric-frame supported thereby, of a yoke-frame having vertical adjustment thereon, a horizontal shaft journaled in said yoke and lying above the fabric, cutting-arms coupled together and lying one upon each side of the fabric, a rack actuated by said shaft to feed the cutters step by step from one end of the fabric to the other, and means for operating said cutters between each feed-movement, substantially as specified.

28. In an embroidering-machine, the combination, with suitable supports and the fabric-frame mounted thereon, of a vertically-adjustable frame carrying a horizontal shaft mounted therein, cutters mounted upon said shaft and arranged to operate upon the fabric, and means for feeding said cutters forward upon the shaft and for operating them between each feed-movement.

29. In an embroidering-machine, the combination, with a fabric frame and a shaft arranged horizontally near one surface of the fabric, of one or more leaf-plates hanging from said shaft and provided with a hook or hooks at the lower end, multiple cams supporting the ends of said shaft, a striker rigid upon said shaft and engaging with an edge cam upon one of the multiple cams, the stitch-forming mechanism, and means for giving said cam-wheels a partial revolution at stated intervals, substantially as specified.

30. In an embroidering-machine, the combination, with a fabric-supporting frame moved by vertical and horizontal threaded shafts engaging with its supports, of pulleys mounted upon said shafts and belted by a straight and a cross belt, respectively, to pulleys loose upon a continuously-revolving driving-shaft, clutches by which either pulley may be temporarily locked with the shaft, armature-levers shifting said clutches, electro-magnets attracting the armatures, electric circuits in which said magnets lie, a stencil which governs the stitch adjustments, stencil-feeding mechanism brought into action by a sliding clutch upon the driving-shaft to which said clutch is splined, a shifting-lever actuated by the attraction of an electro-magnet, and devices for making and breaking the circuit in which said magnet lies, said devices being operated by a separate series of perforations in the stencil, substantially as specified.

31. In an embroidering-machine, the combination, with the reciprocating needle-carriages, of disks journaled upon each side of the central standard, a pawl pivoted on the axis of each disk and supported behind by a pin and in front by a spring, a projection on the foot-piece of each needle-carriage which trips the pawl on the forward movement of the carriage and engages with it as the carriage recedes, and a cord or wire attached to the periphery of each disk and connected with the shifting-lever, throwing the clutch which initiates the movement of the stencil, substantially as specified.

32. In an embroidering-machine, the combination, with the mechanism reversing the movement of the needle-carriages, of a slide-bar seated in the standard and having pins which straddle the insulated end of the pendulum-lever, rods pivoted to each end of said bar and normally supported by cords or wires above the path of the driving-block which moves the needle-carriages, said cords being connected by bell-cranks with the shifting-lever throwing the clutch which initiates the movement of the stencil, substantially as specified, whereby the needles are prevented from contact with the web during the time the latter is in motion.

33. In an embroidering-machine, the combination, with a fabric-frame, and the threaded shafts by which the vertical movements of the fabric-frame are effected, of a pulley loose upon a shaft journaled in a bracket attached to the power-shaft by a hanger, pulleys loosely mounted one on each side of said pulley, sliding splines set in recesses in the shaft and having radial teeth which project within the chambered hub of the central pulley, clutches operating said splines to lock the central with either of the outer pulleys, and levers shifting said clutches, said levers being actuated by the making of an electro circuit by means of a series of perforations in a controlling-stencil, substantially as specified.

34. In an embroidering-machine, the combination, with the clutch-shifting levers which lock the driving-pulleys with their shafts, of electro-magnets operating said levers, separate electric circuits within which said magnets lie, a stencil having several series of perforations and circuit-closing devices lying in the path of said perforations, reciprocating carriages carrying the needles which draw the threads, and devices operated by the thread tension to make and break the circuit of the magnets reversing the motion of said carriages, said stencil having intermittent progressive movement, whereby each of the circuits is made in turn automatically, substantially as specified.

35. In an embroidering-machine, the combination, with a fabric-frame and with a pulley driving the threaded shaft which gives horizontal adjustment to the fabric-frame, of a pulley rigidly mounted upon a driving-shaft, two loose pulleys mounted upon the same shaft and driven in opposite directions, clutches splined to the shaft and adapted to engage with the loose pulleys, and means for operating said clutches to give the driving-shaft movement in opposite directions, substantially as specified.

36. In an embroidering-machine, the combination, with the needle-actuating mechanism, of a stencil by which the movements of the fabric-frame are controlled and timed, and stencil-feeding mechanism set in motion by the needle-actuating mechanism and arrested by the action of the stencil itself, substantially as specified.

37. In an embroidering-machine, the combination, with a fabric-frame having supports which engage with threaded shafts, of mechanism by which said shafts are rotated in either direction, electro-magnetic devices whereby operative connection is effected between the rotating mechanism and the power-shaft, and a stencil having openings of varied length and arrangement by which the rotation of said threaded shafts is timed and controlled, substantially as specified.

38. In an embroidering-machine, the combination, with a movable fabric-frame, of means for adjusting said frame, electro-magnetic devices whereby operative connection is effected between the adjusting mechanism and the power driving the same, a stencil having openings of varied length and relative arrangement whereby the stitch-adjustment is timed and determined, and means for giving to said stencil a progressive movement at proper intervals, substantially as specified.

39. In an embroidering-machine, the combination, with the needle-carriages which are drawn toward the web by weights and from it by belts, of reversing mechanism consisting of oppositely-revolving pulleys loose upon the belt-actuating shaft, clutches splined upon said shaft, levers adapted to engage one or the other of said clutches with one or the other of said pulleys, and electro-magnets which attract one or the other of said levers, the circuits of said magnets being closed and opened by mechanism operated by the draft upon the embroidering-threads, substantially as specified.

40. In an embroidering-machine, a stencil-sheet having four separate longitudinal series of openings representing the time, direction, and relative length of the vertical or horizontal movement, or of both combined, required to effect the successive stitch adjustments, and a fifth series of openings whereby devices are brought into action to continue the advance of the stencil until the adjustments represented by each transverse series of openings are completed, and then to arrest its movement, substantially as specified.

41. In an embroidering-machine, the combination, with mechanism for giving adjustment to the fabric-frame, of a series of circuit breakers and contacts, a stencil-sheet feeding between the same and having four series of openings representing the several adjustments of the fabric-frame and the relative time thereof, and provided also with a fifth series of openings representing the length of each advance movement of the stencil, mechanism for effecting said adjustments, and mechanism for advancing the stencil, the action of the former being initiated by the making of one of the circuits and that of the latter being continued after its initiation by making the circuit in the fifth series and arrested by breaking it, substantially as specified.

42. In an embroidering-machine, the combination, with a stencil-sheet having four longitudinal series of openings of varied length and arrangement, of electric circuits closed and broken by the advance of said sheet, and stitch-adjusting mechanism brought into and out of action by closing and opening said circuits, the openings in the stencil representing the two vertical and two horizontal adjustments of the tambour-frame required for the formation of stitches, substantially as specified.

In testimony whereof I affix my signature in presence of two witnesses.

ROSWELL T. SMITH.

Witnesses:
PARIS H. HILL,
NATE W. GODDARD.